(12) United States Patent
Stokes et al.

(10) Patent No.: US 10,989,537 B2
(45) Date of Patent: Apr. 27, 2021

(54) SONAR SENSOR FUSION AND MODEL BASED VIRTUAL AND AUGMENTED REALITY SYSTEMS AND METHODS

(71) Applicant: FLIR Belgium BVBA, Meer (BE)

(72) Inventors: Paul Stokes, Fleet (GB); Mark Johnson, Vannes (FR); Richard Jales, Eastleigh (GB); Gordon Pope, Hung Hom (HK); Christopher Gatland, Fareham (GB); Aaron Ridout, Chichester (GB)

(73) Assignee: FLIR Belgium BVBA, Meer (BE)

( * ) Notice: Subject to any disclaimer, the term of this patent is extended or adjusted under 35 U.S.C. 154(b) by 219 days.

(21) Appl. No.: 15/977,035

(22) Filed: May 11, 2018

(65) Prior Publication Data
US 2018/0259338 A1   Sep. 13, 2018

Related U.S. Application Data

(63) Continuation of application No. PCT/US2016/061722, filed on Nov. 12, 2016.
(Continued)

(51) Int. Cl.
*G01C 21/00* (2006.01)
*G01S 15/93* (2020.01)
(Continued)

(52) U.S. Cl.
CPC ............ *G01C 21/005* (2013.01); *B63B 49/00* (2013.01); *G01C 21/203* (2013.01); *G01S 7/24* (2013.01);
(Continued)

(58) Field of Classification Search
CPC .. G01C 21/203; G01C 21/005; G01C 21/165; G06K 9/00671; G06K 3/40; G06K 3/60;
(Continued)

(56) References Cited

U.S. PATENT DOCUMENTS 5,475,651 A   12/1995   Bishop et al.
6,163,337 A   12/2000   Azuma et al.
(Continued)

FOREIGN PATENT DOCUMENTS

| CN | 101782396 | 7/2010 |
|---|---|---|
| GB | 2525175 | 10/2015 |
| WO | WO 2010/117278 | 10/2010 |

OTHER PUBLICATIONS

Matthies et al., "Integration of Sonar and Stereo Range Data Using a Grid-Based Representation," Proceedings 1998 IEEE International Conference on Robotics and Automation, Aug. 6, 2002, pp. 727-733, IEEE.
(Continued)

*Primary Examiner* — Tyler J Lee
(74) *Attorney, Agent, or Firm* — Haynes and Boone, LLP

(57) ABSTRACT

Techniques are disclosed for systems and methods for sensor fusion with respect to mobile structures. A mobile structure may include multiple ranging sensor systems and/or receive navigational data from various sensors. A navigational database may be generated that includes data from the ranging sensor systems and/or other sensors. Aspects of the navigational database may then be used to generate an integrated model, which can be used to generally aid in the navigation of the mobile structure.

20 Claims, 13 Drawing Sheets

Related U.S. Application Data

(60) Provisional application No. 62/255,308, filed on Nov. 13, 2015, provisional application No. 62/255,291, filed on Nov. 13, 2015.

(51) Int. Cl.

| | | |
|---|---|---|
| *G01S 13/86* | (2006.01) | |
| *G01S 7/24* | (2006.01) | |
| *G06K 9/00* | (2006.01) | |
| *G05D 1/06* | (2006.01) | |
| *G06T 3/40* | (2006.01) | |
| *G06T 7/20* | (2017.01) | |
| *G01C 21/20* | (2006.01) | |
| *G01S 15/87* | (2006.01) | |
| *H04N 5/232* | (2006.01) | |
| *G01S 7/62* | (2006.01) | |
| *G01S 13/937* | (2020.01) | |
| *G06T 7/50* | (2017.01) | |
| *G06T 7/70* | (2017.01) | |
| *G06T 3/20* | (2006.01) | |
| *G06T 3/60* | (2006.01) | |
| *G06T 11/60* | (2006.01) | |
| *B63B 49/00* | (2006.01) | |
| *G05D 1/02* | (2020.01) | |

(52) U.S. Cl.
CPC ............ *G01S 7/629* (2013.01); *G01S 13/862* (2013.01); *G01S 13/937* (2020.01); *G01S 15/87* (2013.01); *G01S 15/874* (2013.01); *G01S 15/93* (2013.01); *G05D 1/0206* (2013.01); *G05D 1/0692* (2013.01); *G06K 9/00671* (2013.01); *G06T 3/20* (2013.01); *G06T 3/40* (2013.01); *G06T 3/60* (2013.01); *G06T 7/20* (2013.01); *G06T 7/50* (2017.01); *G06T 7/70* (2017.01); *G06T 11/60* (2013.01); *H04N 5/23258* (2013.01); *H04N 5/23267* (2013.01); *G06T 2207/10028* (2013.01); *G06T 2207/20212* (2013.01); *G06T 2207/30252* (2013.01); *G06T 2210/22* (2013.01)

(58) Field of Classification Search
CPC ......... G06K 11/60; G06K 2207/10028; G06K 2207/20212; G06K 2207/30252; G06K 2210/22; G06K 3/20; G06K 7/20; G06K 7/50; G06K 7/70; B63B 49/00; G01S 13/862; G01S 13/937; G01S 15/87; G01S 15/874; G01S 15/93; G01S 7/24; G01S 7/629; G05D 1/0206; G05D 1/0692; H04N 5/23258; H04N 5/23267

See application file for complete search history.

(56) References Cited

U.S. PATENT DOCUMENTS

| | | |
|---|---|---|
| 6,191,808 B1 | 2/2001 | Katayama et al. |
| 6,241,609 B1 | 6/2001 | Rutgers |
| 6,323,895 B1 | 11/2001 | Sata |
| 6,377,515 B1 | 4/2002 | Healey |
| 6,449,215 B1 | 9/2002 | Shell |
| 6,654,031 B1 | 11/2003 | Ito et al. |
| 6,890,262 B2 | 5/2005 | Oishi et al. |
| 6,917,370 B2 | 7/2005 | Benton |
| 7,340,099 B2 | 3/2008 | Zhang |
| 7,426,437 B2 | 9/2008 | Breed et al. |
| 8,291,757 B2 | 10/2012 | Johnson et al. |
| 9,739,884 B2* | 8/2017 | Proctor ................... G01S 7/526 |
| 10,353,059 B2* | 7/2019 | Mandelert ........... G01S 15/8904 |
| 2002/0071345 A1 | 6/2002 | Chiang et al. |
| 2006/0244826 A1 | 11/2006 | Chew |
| 2010/0157736 A1 | 6/2010 | Riordan et al. |
| 2010/0198488 A1 | 8/2010 | Groitzsch et al. |
| 2012/0099400 A1 | 4/2012 | Debrunner et al. |
| 2012/0320224 A1 | 12/2012 | Miyoshi et al. |
| 2015/0078123 A1* | 3/2015 | Batcheller ............... G01S 15/86 367/7 |
| 2015/0242769 A1* | 8/2015 | Kezeu .............. G06Q 10/06314 705/7.11 |
| 2015/0308856 A1* | 10/2015 | Srinivasan .............. H04L 67/12 340/870.02 |
| 2015/0358560 A1 | 12/2015 | Boulanger et al. |
| 2016/0069681 A1 | 3/2016 | Johnson et al. |
| 2016/0214534 A1 | 7/2016 | Richards et al. |
| 2016/0259053 A1* | 9/2016 | Proctor ............... G01S 15/8902 |
| 2016/0259054 A1* | 9/2016 | Proctor ................... G01S 7/526 |
| 2016/0370187 A1 | 12/2016 | Gatland et al. |
| 2017/0082739 A1* | 3/2017 | Horner .................... G01S 7/521 |
| 2017/0176586 A1 | 6/2017 | Johnson et al. |
| 2017/0184414 A1 | 6/2017 | Johnson et al. |
| 2017/0219703 A1* | 8/2017 | Proctor ................. G01S 15/876 |
| 2017/0277189 A1 | 9/2017 | Johnson et al. |
| 2017/0285167 A1* | 10/2017 | Proctor ..................... G01S 7/54 |
| 2019/0258258 A1* | 8/2019 | Tyers ..................... B63H 25/04 |

OTHER PUBLICATIONS

Almeida, Rob, "3D Recreation of Höegh Osaka's Intentional Grounding in the Solent," gCaptain, [retrieved on Oct. 19, 2018], 4 Pages [online]. Retrieved from the Internet: <https://gcaptain.com/3d-dynamic-replay-hoegh-osakas-grounding-solent/>.

Claxton, Tim, "Augmented Reality: New Features in Navigation Apps," boats.com, Nov. 13, 2014, [retrieved on May 14, 2015], 9 Pages [online]. Retrieved from the Internet: <https://www.boats.com/reviews/augmented-reality-new-features-navigation-apps/>.

Cooklev et al., "An Implementation of IEEE 1588 Over IEEE 802.11b for Synchronization of Wireless Local Area Network Nodes," IEEE Transactions on Instrumentation and Measurement, Oct. 2007, pp. 1632-1639, vol. 56, No. 5.

Hugues et al., "An Experimental Augmented Reality Platform for Assisted Maritime Navigation," Augmented Human Conference, Apr. 2-3, 2010, 6 Pages, Megeve, France.

Keefe, Joseph, "Futuristic Bridge Concept by Rolls-Royce," MarineLink, Feb. 25, 2015, [retrieved on Oct. 18, 2018], 9 Pages [online]. Retrieved from the Internet: <https://www.marinelink.com/news/futuristic-rollsroyce386595>.

Korneliussen et al., "Combining multibeam-sonar and multifrequency-echosounder data: examples of the analysis and imaging of large euphausiid schools," ICES Journal of Marine Science, Apr. 17, 2009, pp. 991-997, vol. 66, Oxford Journals.

Li et al., "The 3-D Map Building of AUV Based on D-S Information Fusion," Proceedings of the 33$^{rd}$ Chinese Control Conference, Jul. 28-30, 2014, pp. 8639-8644, Nanjing, China.

"Raymariner," MarineTraffic, [retrieved on Oct. 18, 2018], 7 Pages [online]. Retrieved from the Internet: <https://www.marinetraffic.com/en/ais/details/ships/shipid:193801/mmsi:235065795/imo:0/vessel:RAYMARINER>.

"Sensor fusion," Wikipedia, [retrieved on Oct. 18, 2018], 4 Pages [online]. Retrieved from the Internet: <https://en.wikipedia.org/wiki/Sensor_fusion>.

"What is a marine navigation software?" MaxSea, [retrieved on Oct. 18, 2018], 2 Pages [online]. Retrieved from the Internet: <http://www.maxsea.com/marine_navigation_software>.

* cited by examiner

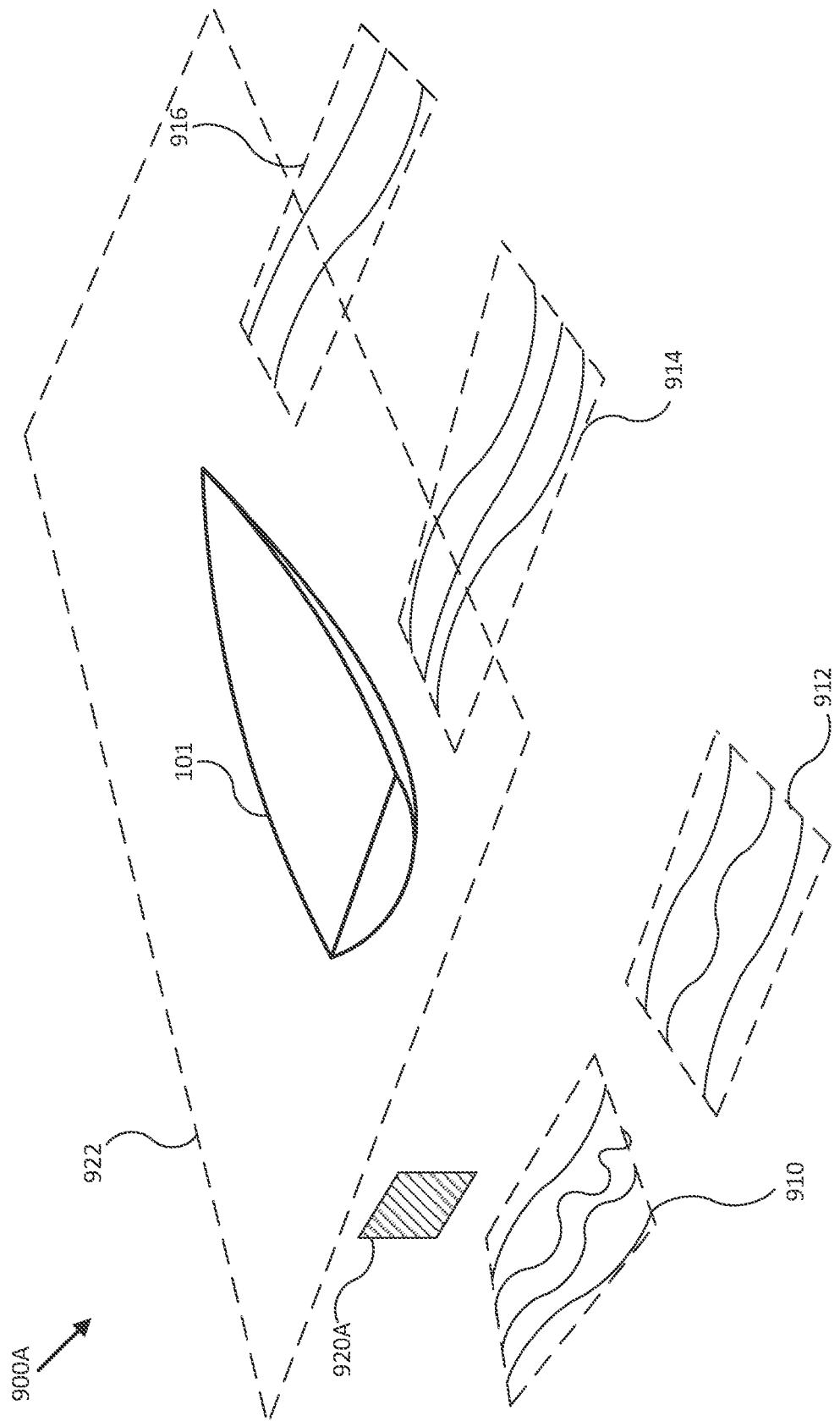

SONAR SENSOR FUSION AND MODEL BASED VIRTUAL AND AUGMENTED REALITY SYSTEMS AND METHODS

CROSS-REFERENCE TO RELATED APPLICATIONS

This application is a continuation of International Patent Application No. PCT/US2016/061722 filed Nov. 12, 2016 and entitled "SONAR SENSOR FUSION AND MODEL BASED VIRTUAL AND AUGMENTED REALITY SYSTEMS AND METHODS," which is incorporated herein by reference in its entirety International Patent Application No. PCT/US2016/061722 filed Nov. 12, 2016 claims priority to and the benefit of U.S. Provisional Patent Application No. 62/255,291 filed Nov. 13, 2015 and entitled "SENSOR FUSION AND MODEL BASED VIRTUAL AND AUGMENTED REALITY SYSTEMS AND METHODS," which is hereby incorporated by reference in its entirety.

International Patent Application No. PCT/US2016/061722 filed Nov. 12, 2016 also claims priority to and the benefit of U.S. Provisional Patent Application No. 62/255,308 filed Nov. 13, 2015 and entitled "COMBINING MULTIPLE NAVIGATIONAL DATA SOURCES SYSTEMS AND METHODS," which is hereby incorporated by reference in its entirety.

TECHNICAL FIELD

One or more embodiments of the invention relate generally to navigational systems and more particularly, for example, to systems and methods for navigational sensor fusion.

BACKGROUND

Navigational systems aid in the navigation of watercraft and other mobile structures. A mobile structure may include multiple navigational systems to aid in guiding the mobile structure. For example, a mobile structure may include radar, sonar, GNSS receivers, and other communications devices. Conventionally, these systems are separate from each other and do not intercommunicate as each system performs separate functions. For example, radar systems may be used to produce data showing the geometry of terrain or the presence of other objects/vehicles near a mobile structure. Sonar may be used to perform bathymetry, detect underwater hazards, find fish, and/or otherwise assist in navigation by producing data and/or imagery of a water column and/or a floor of a body of water beneath a watercraft. Each system typically includes its own display or display view to present data from the system, and each view is typically presented without reference to data from any of the other sensors. Thus, there is a need in the art for a methodology to combine navigational sensor data from disparate sensors to provide an intuitive, meaningful, and relatively full representation of the environment, particularly in the context of aiding in the navigation of a mobile structure.

SUMMARY

Techniques are disclosed for systems and methods to provide sensor fusion for mobile structures. In one embodiment, an apparatus may include a plurality of ranging sensor systems associated with a mobile structure, wherein two or more of the ranging sensor systems are configured to sense at least a portion of an underwater environment and provide corresponding ranging sensor data associated with the portion of the underwater environment; and a logic device. The logic device may be configured to receive the ranging sensor data from the ranging sensor systems and generate an integrated model of the underwater environment by combining the ranging sensor data from the two or more ranging sensor systems.

In another embodiment, a method may include receiving ranging sensor data from two or more ranging sensor systems configured to sense at least a portion of an underwater environment and provide corresponding ranging sensor data associated with the portion of the underwater environment; and generating an integrated model of the underwater environment by combining the ranging sensor data from the two or more ranging sensor systems.

In another embodiment, an apparatus may include a logic device configured to communicate with a plurality of navigational sensors and at least one orientation and/or position sensor (OPS), wherein each navigational sensor is configured to provide navigational data associated with a mobile structure. The logic device may be configured to receive the plurality of navigational data from the corresponding plurality of navigational sensors, receive, from the OPS, orientation and/or position data associated with at least one of the plurality of navigational data, and generate a navigational database by combining the plurality of navigational data based, at least in part, on the orientation and/or position data.

In another embodiment, a method may include receiving a plurality of navigational data from a corresponding plurality of navigational sensors, wherein each navigational sensor is configured to provide navigational data associated with a mobile structure; receiving, from at least one orientation and/or position sensor (OPS), orientation and/or position data associated with at least one of the plurality of navigational data; and generating a navigational database by combining the plurality of navigational data based, at least in part, on the orientation and/or position data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 9A illustrates a diagram of a display of a sensor fusion navigational system displaying an integrated model representing the example environment of FIG. 8 in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sensor fusion navigational systems, such as those including various portable and/or fixed/mounted navigational sensors associated with a mobile structure or vehicle, may generate a variety of sensor information that can be combined or fused together to create an integrated model that provides an intuitive understanding of the status of the mobile structure to a user. The various navigational sensors may include imaging devices, sonar systems including one or more sonar transducer assemblies, radar systems, other ranging sensor systems, global navigation satellite systems (GNSSs) and/or other position sensors, and various orientation sensors, gyroscopes, accelerometers, position sensors, and/or speed sensors providing measurements of an orientation, a position, an acceleration, and/or a speed of the device, the sonar transducer and/or radar or ranging system assemblies, a coupled mobile structure, and/or other navigational sensors.

For example, the sensors may be mounted to or within the mobile structure (e.g., a watercraft, aircraft, motor vehicle, and/or other mobile structure), may be integrated with other sensor assemblies, or may be integrated within a portable device. Examples of portable devices include portable GNSSs, smartphones, tablets, portable computers, portable sensor suites, cameras, and other devices. Embodiments of the present disclosure may combine sensor data from a plurality of sensors and present the sensor data according to a single reference frame or display, thereby providing enhanced data to a user that may also be more intuitive and easier to interpret than individually referenced data from each of the sensors. In certain embodiments, a 2D or 3D integrated model may also be rendered from the sensor data.

Figure 1A:
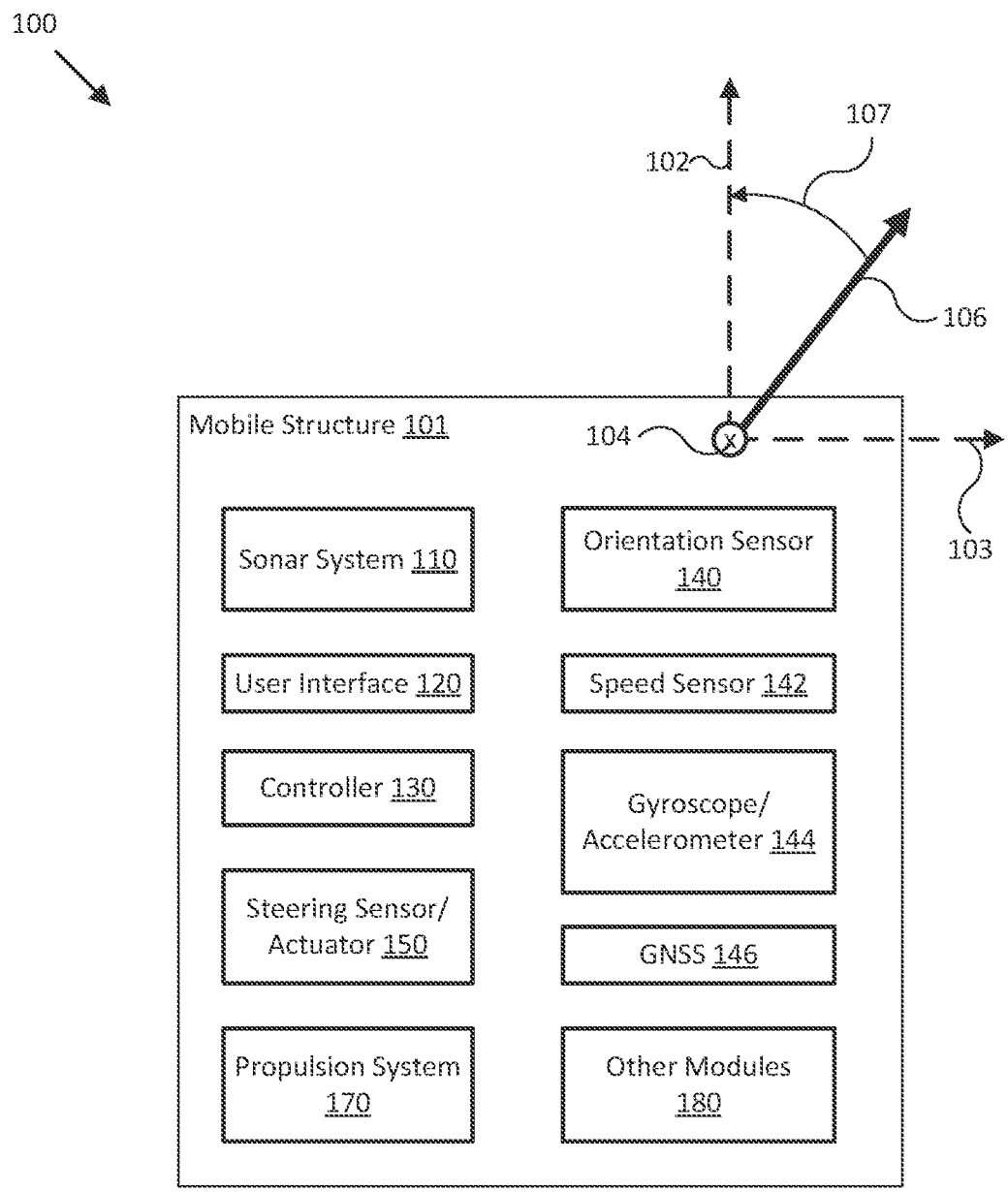
FIG. 1A illustrates a block diagram of a sensor fusion navigational system in accordance with an embodiment of the disclosure.

FIG. 1A illustrates a block diagram of a sensor fusion navigational system in accordance with an embodiment of the disclosure. In various embodiments, system 100 may be adapted to measure an orientation, a position, an acceleration, and/or a speed of mobile structure 101, sonar system 110, user interface 120, and/or other elements of system 100. System 100 may include a plurality of navigational sensors that may produce navigational data. Such navigational sensors may include, for example, sonar system 110, steering sensor/actuator 150, orientation sensor 140, speed sensor 142, gyroscope/accelerometer 144, global navigation satellite system (GNSS) 146, and/or other modules 180 (i.e., a radar system, other ranging sensors, various environmental sensors, sensors directed towards the dynamic characteristics of the mobile structure, and/or other sensors). In certain embodiments, a plurality of certain types of the same sensor may be included within system 100.

System 100 may use these measurements to form various views of sensor data provided by various navigational sensors within system 100 and/or to adjust an orientation of one, some, or all of the navigational systems of system 100 according to a desired operation of elements of system 100 and/or mobile structure 101. In some embodiments, system 100 may display resulting sensor data and/or imagery to a user through user interface 120, and/or use the sensor data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sensor data and/or imagery for a particular type of mobile structure 101, such as a drone, a watercraft, an aircraft, a robot, a vehicle, and/or other types of mobile structures. In one embodiment, system 100 may include one or more of sonar system 110, user interface 120, controller 130, orientation sensor 140, speed sensor 142, gyroscope/accelerometer 144, GNSS 146, steering sensor/actuator 150, propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

In certain embodiments, orientation and/or position sensors (OPSs) may be included on mobile structure 101. The OPSs may be individually coupled to mobile structure 101 or may be contained within other modules and systems such as sonar system 110 and various imaging systems. The orientation and/or position sensors may detect the roll, pitch, and/or yaw of mobile structure 101 and output data related to the roll, pitch, and/or yaw to controller 130. Controller 130 may then utilize roll, pitch, and/or yaw to correct data obtained by various sensors and systems coupled to mobile structure 101 (e.g., sonar, radar, and/or other ranging sensor systems, and/or other sensors). For example, sonar data of a seafloor may be significantly affected by roll, pitch, and/or yaw of a mobile structure because emitted sonar pulses may then travel to the ocean floor at an angle, which can significantly increase the detected distance. Using data related to corresponding angles of roll, pitch, and/or yaw, controller 130 may then correct or otherwise adjust such erroneous readings.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. In certain embodiments, sonar system 110 may include a plurality of sonar assemblies, where each sonar device includes some or all of the components described herein. In such embodiments, the relative positions and/or orientations of the sonar assemblies may be measured and/or otherwise determined. Using the relative positions and/or orientations, a more accurate integrated model may be generated by the plurality of sonar assemblies.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, each sonar assembly of sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Each sonar assembly may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. Sonar system 110 may include any combination of single, dual, and/or multichannel sonar systems. In certain embodiments, sonar system 110 may include a plurality of single, dual, and/or multichannel sonar systems. Thus, sonar system 110 may include, for example, one single and one dual channel system, two dual channel systems, two single channel systems, two multichannel systems, and/or three or more sonar systems. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such an embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110. Still other embodiments may not include the sonar system 110, but may include other sensor assemblies and other components.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals. Additionally, user interface 120 may also be adapted to display a 2D or 3D integrated model that may combine sensor data from a plurality of sensors.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of mobile structure 101 and/or various elements of system 100.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented according to any global navigation satellite system (GNSS), including a GPS, GLONASS, and/or Galileo based receiver and/or other device capable of determining absolute and/or relative position of mobile structure 101 (e.g., or an element of mobile structure 101 and/or system 100, such as sonar system 110 and/or user interface 120) based on wireless signals received from space-born and/or terrestrial sources (e.g., eLoran and/or other at least partially terrestrial based systems), for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, LIDAR systems, a salinity sensor such as a sea surface salinity sensor, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared and/or visible light illuminators, infrared and/or visible light cameras, radars, sonars, LIDAR systems, and/or other actuated devices) coupled to mobile structure 101, where each actuated device includes one or more actuators adapted to adjust an orientation of the device, relative to mobile structure 101, in response to one or more control signals (e.g., provided by controller 130). Additionally, other modules 180 may also include orientation and/or position sensors associated with sensors of the other modules 180. The orientation and/or position sensors may be incorporated within the sensors of the other modules 180, or may be separate from the sensors of the other modules 180.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
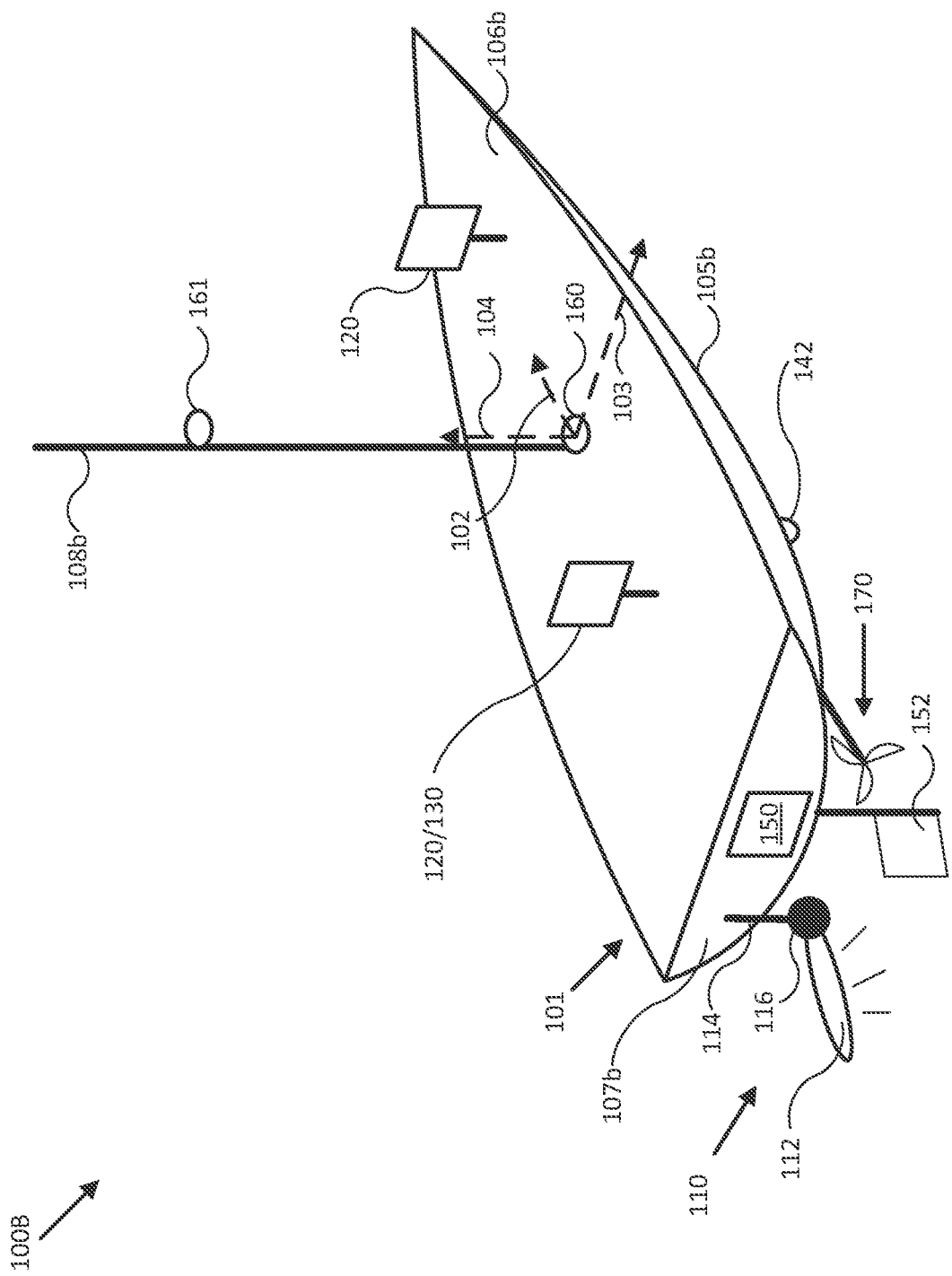
FIG. 1B illustrates a diagram of a mobile structure with a sensor fusion navigational system in accordance with an embodiment of the disclosure.

FIG. 1B illustrates a diagram of a mobile structure with a sensor fusion navigational system in accordance with an embodiment of the disclosure. In the embodiment shown in FIG. 1B, system 100B may be implemented to provide navigational data, such as an integrated model or some data outputs to the user, for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, GNSS 146, and/or other modules 180 such as radar systems), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110 which may include one or more sonar assemblies. The sonar assembly in turn may include transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar orientation and/or position sensor (OPS), which may include one or more sensors corresponding to orientation sensor 140, gyroscope/accelerometer 144 and/or GNSS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106*b*) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. Other embodiments of the user interface 120 may include a portable device that is not physically coupled to the user and/or mobile structure 101. In various embodiments, user interface 120 may be implemented with a relatively thin display that is integrated into a PCB or other electronics of the corresponding device or structure in order to reduce size, weight, housing complexity, and/or manufacturing costs.

As shown in FIG. 1B, in some embodiments, speed sensor 142 may be mounted to a portion of mobile structure 101, such as to hull 105*b*, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105*b*. In alternative embodiments, speed sensor 142 may be implemented as a wind velocity sensor, for example, and may be mounted to mast/sensor mount 108*b* to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108*b* (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
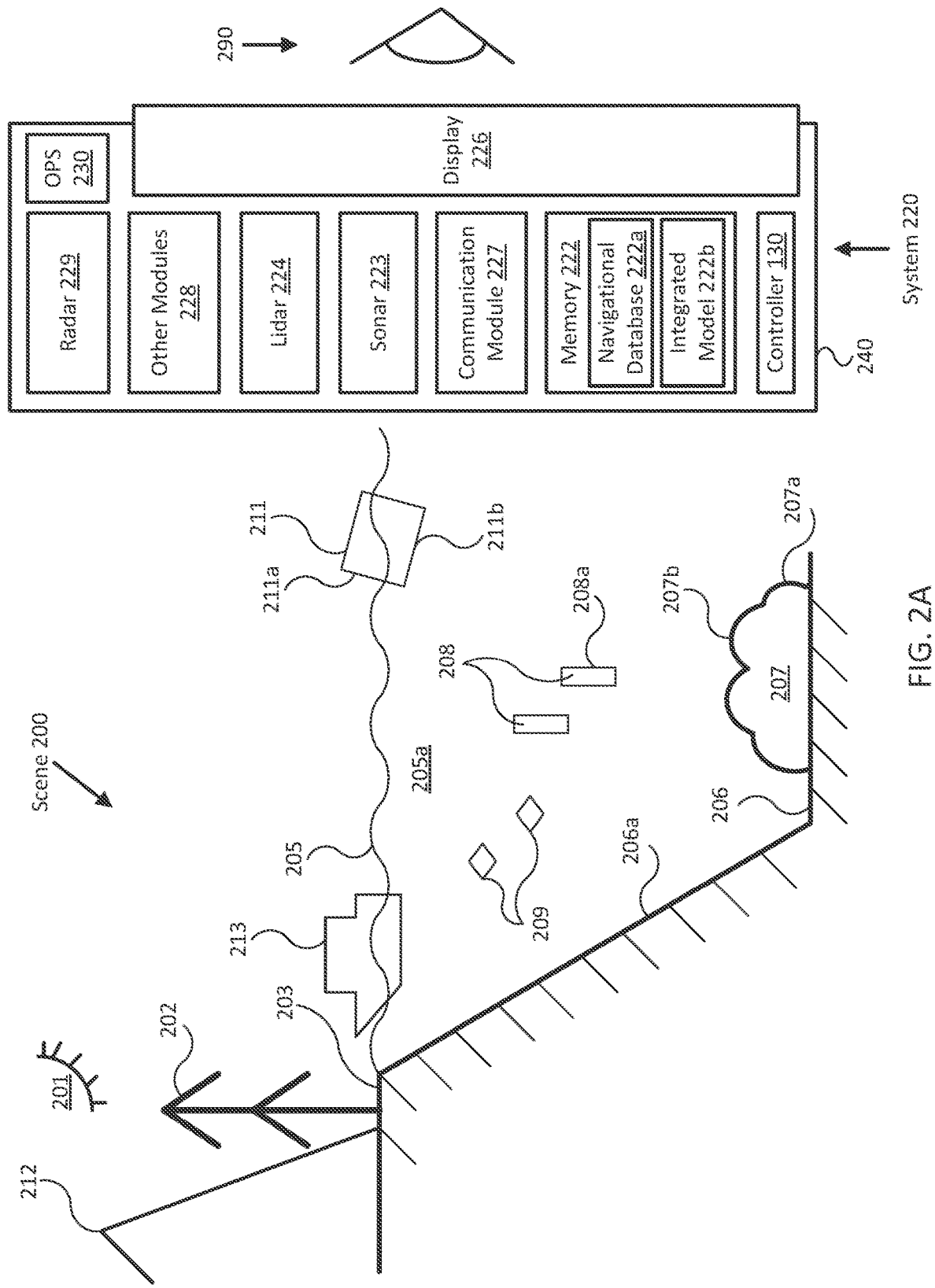
FIG. 2A illustrates a diagram of a sensor fusion navigational system operating in an example environment in accordance with an embodiment of the disclosure.

FIG. 2A illustrates a diagram of a sensor fusion navigational system operating in an example environment in accordance with an embodiment of the disclosure. In various embodiments, system 220 may be implemented with similar functionality as that described with reference to user interface 120 and/or controller 130 in FIGS. 1A and 1B. In the embodiment shown in FIG. 2A, system 220 may be configured to provide sonar imagery (using sonar system 223), LIDAR based imagery (using LIDAR system 224), and/or radar imagery (using radar system 229) of scene 200 to a user 290 using a display 226. For example, system 220 may be configured to display integrated rendered image data (e.g., a rendered integrated model constructed from data provided by sonar system 223, LIDAR system 224, and/or radar system 229), or display rendered radar and/or LIDAR data in a portion of a field of view (FOV) of display 226 that is above waterline 205 and to display rendered sonar and/or LIDAR data in a portion of the FOV that is below waterline 205.

Underwater data provided by sonar system 223 and/or LIDAR system 224 as well as above water data provided by radar 229 and/or LIDAR system 224 may include an image of a surface of a body of water 205*a* and various objects or structures above waterline 205, such as the sun 201, a tree 202, a beach 203, a hill 212, floating object 211 or floating object 211*a* (the part of the floating object 211 above the waterline), and/or vehicle 213. Such image data may be processed using feature/pattern recognition techniques to determine a location of waterline 205 within the image data (e.g., if imaging modules 223 and/or 224 are oriented to capture a portion of scene 200 including waterline 205). Sonar data, which may be provided by bathymetric charts and/or past or current use of sonar system 110 of FIGS. 1A and 1B, may include data representative of waterline 205, a floor 206 of body of water 205*a*, a bank 206*a* of floor 206, a bottom feature 207 (e.g., a rock or sunken ship), fish 208 (e.g., or other fish, game, wildlife, and/or other flora and fauna), other submerged objects 209 (e.g., trash, seaweed), floating object 211*b* (the part of floating object 211 below the waterline), and/or other underwater features within or surrounding body of water 205*a*.

A sea state of body of water 205*a* may also be determined using data from sonar system 223 and/or LIDAR system 224 as well as, for example, thermal sensors. In such an embodiment, thermal sensors may provide for thermal readings of body of water 205*a* or sections thereof. In FIG. 2A, waterline 205 may be choppy. Analysis of radar data from radar 229 may determine the choppiness of waterline 205 and, thus, determine the sea state of the surface of body of water 205*a*. In certain embodiments, the sea state may be rendered or communicated within an integrated model by, for example, graphical representations (e.g., animating the sea state in a 2D or 3D manner or through representations of the sea state using sea state indicators such as rendering of colored regions, transparent, semi-transparent, or otherwise to correspond with the sea temperature of a section of the sea) or textual representations (e.g., text describing the sea state or rating the sea state or sea temperature according to a scale such as a numerical scale).

Data from the modules within system 220 or system 100 may be combined within a navigational database 222*a*. Navigational database 222*a* may, for example, be contained within memory 222. Memory 222 may be communicatively connected to other components within the system 100 and/or system 220. Navigational database 222*a* may receive data from one or both of system 100 or system 220. In certain embodiments, communications between the various systems and devices of system 100 and/or system 220 may be communicated either through wired communications connections and/or through wireless communications.

Additionally, memory 222 may receive data from other modules, sensors, imaging systems, or devices that are either coupled or not coupled with mobile structure 101 to generate navigational database 222*a*. For example, navigational database 222*a* may include data from a smartphone of a user, from other vehicles, from GNSS satellites, from fixed devices such as traffic control services, from other communications systems such as radios and laser communications, and from cloud based interior database. In certain such embodiments, communication module 227 may transmit and/or receive such navigational data stored within navigational database 222a. Communication module 227 may be stabilized and may utilize orientation and/or position data to stabilize communication module 227 to better transfer and/or receive data. Such stabilization may reduce bandwidth requirements of a network.

Navigational database 222a may, in certain embodiments, be used to aid in navigation of mobile structure 101 by fusing together data from a plurality of sensors such as a plurality of ranging sensor systems (e.g., sonar, LIDAR, radar, or other sensors) as well as non-ranging sensor systems (e.g., thermal sensors or other sensors). The data may be combined in a manner to aid in the navigation of the mobile structure or assist in the presentation of the data to an operator of the mobile structure or a user of a display in a manner that may make the presentation easier to understand, more complete, and/or more informative. In certain embodiments, an operator may be a person in operational control of the mobile structure while a user may be a person in control of an electronic device that may contain the display. The operator and/or the user may be the same person or may be different people.

For example, the data may be combined into a point cloud database (which may be a part of navigational database 222a) and the point cloud database may be used to generate a 3D representation of the environment around the mobile structure. In certain examples, navigational database 222a may include data from sonar system 223, LIDAR system 224, and/or radar 229. Navigational database 222a may use at least some of the data to generate an integrated model 222b. Integrated model 222b may be, for example, a 2D or 3D representation of an environment near mobile structure 101. Integrated model 222b may present the environment from substantially the point of view of the viewer of the vehicle (e.g., from the point of view of a bridge of a watercraft or from the point of view of where an imaging sensor may be located), from a top down point of view, from an angled view, or from a free-form view (i.e., where a user may select a viewpoint).

In certain embodiments, integrated model 222b may combine data from multiple sensors, such as, for example, data from sonar system 223, LIDAR system 224, and/or radar 229. Integrated model 222b may combine data from multiple sensors into one view. Thus, a single view of integrated model 222b may include data from multiple sensors. Integrated model 222b may comprise a rendering of a virtual representation of the environment (e.g., render the environment from scratch, such as with a full 3D model) or may use data from one or more sensors as a base view and render additional data "on top" of the base view, such as in an overlay with variable transparency, for instance (e.g., using sonar data to create the rendering of an underwater environment and then include further thermal data of the sea on top of the sonar data).

Features detected by sonar system 223 may be incorporated into integrated model 222b. For example, sonar system 223 may detect and/or output data representative of waterline 205, floor 206 of body of water 205a, bank 206a of floor 206, bottom feature 207 (e.g., a rock or sunken ship), fish 208, other submerged objects 209 (e.g., trash, seaweed), floating object 211b, other underwater features within or surrounding body of water 205a, and/or other features. Such underwater features may be rendered within the integrated model. Such underwater features may be indicated and/or differentiated within the integrated model from, for example, features above the water line through use of any combination of contour lines, color and/or greyscale mapping and/or shading, three dimensional rendering, and/or other volumetric rendering techniques. In some embodiments, surface orientations of various underwater features (e.g., of side 207a or top 207b of bottom feature 207, or of side 208a of fish 208) may be detected and/or differentiated using similar sonar data and/or other processing techniques.

In various embodiments, integrated model 222b may be generated from the navigational database 222a and shown on display 226. The portions of any of the image data from visible spectrum imaging modules and infrared imaging modules, sonar data from sonar system 110, radar data from radar 229, GNSS data from GNSS 146, and/or other data from other navigational sensors that are rendered and displayed by display 226, and the techniques used to render the imagery, may be selected based on a point of view of display 226 to provide a view fusing the data of multiple navigational sensors.

Such fusing may be demonstrated in an example where the position of the mobile structure is determined. In certain embodiments, the resolution of GNSS data may result in positional errors of multiple feet. Additionally, connection to various GNSS satellites may be periodically lost and GNSS 146 may be miscalibrated and/or otherwise inaccurate. In such instances, the mobile structure may utilize data from other sensors to complement or supplement the GNSS data. For example, LIDAR data, sonar data, and/or radar data may be used to help determine the position of mobile structure 101. Such data may allow controller 130 to analyze the data and determine the position of the mobile structure according to the data. For example, controller 130 may roughly determine the position of mobile structure 101 from current or outdated GNSS data, determine landmarks in the environment around mobile structure 101, and then may use LIDAR, sonar, and/or radar data to locate such landmarks within the data. Controller 130 may then determine the distance from the mobile structure to one or more such landmarks and, thus, determine the location of mobile structure 101.

In a further embodiment, the position of mobile structure 101 may be determined from both the GNSS data and other data (e.g., the controller may determine a first position of mobile structure 101 from the GNSS data and may independently determine a second position of mobile structure 101 from other data). The GNSS data may then be aligned with other data to generate an integrated model. Aligning may associate an aspect of the GNSS data to an aspect of another navigational data. Aligning may include, for example, determining a global position of a detected terrain feature (e.g., an underwater ridge detected by sonar may be determined to be positioned in an area indicated by GNSS to include an underwater ridge), combining GNSS data with detected weather conditions (to determine the position of the weather condition), and/or other techniques that may combine GNSS data with other navigational data to increase the accuracy of the navigational data, better present the data to a user, and/or other improvements.

Additionally, in certain embodiments, a position determined from the GNSS data may then be compared to the position determined from the other sensors and any mismatches may be highlighted in the rendering of the integrated model. In certain embodiments, controller 130 may also include algorithms to, if a mismatch is detected, render the integrated model according to data from a preferred sensor or module (e.g., render the integrated model according to one of GNSS data, visual image data, thermal image data, radar data, or sonar data). Also, the controller may, if the first position and second position are determined to substantially match (e.g., if terrain features are within, for example, +/−25 feet of their positions measured using the different sensors) the controller may indicate that the first position and the second position are matching. In other embodiments, controller 130 may compare data of other sensors related to other aspects of the database and/or the integrated model and determine any matches or mismatches within the data of navigational database 222a. The matches and/or mismatches may be directed to any aspect of navigational database 222a or integrated model 222b. For example, matches and/or mismatches between terrain features, wildlife (e.g., flora and/or fauna), mobile structure position, environmental conditions, and/or other aspects of data within navigational database 222a may be highlighted. The matches and/or mismatches may then be highlighted within display 226, such as through renderings within the integrated model.

Additionally, in another embodiment, the position of mobile structure 101 may first be determined, and, using radar, sonar, image, and/or other data, positions of other vehicles and/or landmarks may be determined. Thus, in such embodiments, the position of mobile structure 101 may first be determined. Then, the various sensors on mobile structure 101 may receive data associated with the position of the other vehicles, or data may be sent to mobile structure 101 from the other vehicles or third party data related to such may be sent to mobile structure 101. For example, the visible and/or infrared imaging module 223 and/or 224 may, through image data, determine a distance of the vehicle from mobile structure 101. Another module and/or the OPS may then determine the direction that the visible and/or infrared imaging module 223 and/or 224 is pointed towards and, accordingly, determine where, in relation to mobile structure 101, the vehicle is located. Thus, the position of the other vehicle may then be determined.

As shown, system 220 may include one or more controllers 130 (e.g., including memory 222), sensors (e.g., sonar system 223, LIDAR system 224, and/or radar 229), display 226, communication module 227, and/or other modules 228 facilitating operation of system 220, which may or may not all be disposed within a common housing 240. In certain embodiments, system 220 may be a portable device or may be integrated within a mobile structure. In other embodiments, the components of system 220 may distributed over a combination of one or more portable device, the mobile structure, and/or external devices, structures, and vehicles. In certain embodiments, one or more of the modules shown in FIG. 2A may be integrated with a stationary user interface and/or mount (e.g., coupled to deck 106b or mast/sensor mount 108b of mobile structure 101 in FIG. 1B) and be configured to communicate with devices within housing 240 through a distributed embodiment of communication module 227.

Controller 130 and/or memory 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile structure 101, for example, similar to controller 130. In certain embodiments, controller 130 of system 220 may be integrated or may be the same as controller 130 and, thus, may be integrated within mobile structure 101. In other embodiments, system 220 or part of system 220 may be separate from mobile structure 101 and, accordingly, controller 130 and controller 130 may be separate. In such embodiments, controller 130 and controller 130 may be communicatively coupled through, for example, WiFi, Bluetooth, direct data links, NFC, and other appropriate communication data methods. In some embodiments, controller 130 may be in communication with various modules of system 220 and render or display image data in any portion of an FOV of display 226. In various embodiments, controller 130 and memory 222 may be integrated together, for example, or may be implemented in a distributed manner across a number of individual controllers and/or memories.

In the embodiment shown in FIG. 2A, system 220 includes OPS 230. In some embodiments, controller 130 may be configured to receive sonar data, radar data, and/or other data based on a measured position and/or orientation provided by OPS 230. OPS 230 may be implemented as one or more orientation sensors, GNSS sensors, differential GNSS sensors, orientation/position reference transducers and/or optical sensors (e.g., for actuators), visible spectrum and/or infrared imaging modules, and/or other sensors configured to measure a relative and/or absolute orientation and/or position of system 220 and/or any element of system 220, including display 226, and provide such measurements to controller 130.

In some embodiments, OPS 230 may be distributed amongst the various modules of system 220 and include one or more individual module OPSs configured to measure orientations and/or positions of various elements of system 220, other ranging sensors, and/or a separate display OPS configured to measure a position and/or orientation of display 226. In various embodiments, controller 130 may be configured to combine image data and sonar data according to OPS measurements and/or measurements of an orientation and/or position of a coupled sonar system (e.g., from a corresponding OPS) and/or mobile structure 101 to produce combined imagery, such as three dimensional sonar images of scene 200 below waterline 205. In other embodiments, controller 130 may be configured to use orientation and/or position measurements of elements of system 220, other ranging sensors, and/or mobile structure 101 to control one or more actuators to adjust a position and/or orientation of elements of system 220 and/or portions of an associated sonar system (e.g., transducer assembly 112) to image or ensonify a particular position and/or orientation of scene 200 relative to an FOV of display 226.

Display 226 may be implemented as one or more LCDs, OLEDs, touch screen displays, projection devices, and/or other digital displays that may be configured to display the integrated model rendered by controller 130 to user 290. In some embodiments, the effective optical zoom level may be adjusted to produce an FOV for display 226 that substantially reproduces a direct view of scene 200 as experienced by user 290, for example, so that objects within scene 200 are approximately the same size when viewed by user 290 with or without use of system 220. In such embodiments, the effective optical zoom level may be adjusted by sensing a distance between user 290 and display 226 and then selecting the effective optical zoom level based on that distance to reproduce the direct view of scene 200. In other embodiments, the effective optical zoom level may be adjusted by user input to reproduce the direct view and/or to select a higher or lower effective optical zoom level to increase or decrease the FOV of and/or the image detail produced by display 226. The effective optical zoom level may be adjusted using digital image processing techniques, manual and/or actuated adjustment of optical components within imaging modules 223 and/or 224, or any combination of image processing or optical adjustments.

Communication module 227 may be implemented as any wired and/or wireless interface configured to communication sensor data, configuration data, parameters, and/or other data and/or signals between system 220 and other elements of mobile structure 101 (e.g., as shown in FIGS. 1A and 1B) and/or amongst modules of system 220. As described herein, in some embodiments, communication module 227 may be implemented in a distributed manner such that portions of communication module 227 are implemented within one or more modules of system 220 that may or may not be disposed within housing 240.

Other modules 228 may include other and/or additional sensors, sensor arrays, imaging modules, actuators, logic devices, communications modules/nodes, power and/or power distribution components, and/or user interface devices used to provide additional environmental information and/or configuration parameters, for example, and/or to adjust a position and/or orientation of system 220. In some embodiments, other modules 228 may include various environmental sensors providing measurements and/or other sensor signals that can be displayed to a user and/or used by other devices of system 220 (e.g., controller 130) to facilitate operation of system 220. Such environmental sensors may include sensors configured to determine cloud, wind, precipitation, or wind conditions of an environment around mobile structure 101. In some embodiments, other modules 228 may include one or more buttons and/or other user input devices configured to accept manual user input. In other embodiments, other modules may include one or more distance and/or user presence detectors configured to detect user 290 and/or measure or estimate a distance between display 226 and user 290.

In various embodiments, system 220 may be implemented in a single housing 240 with a single display (e.g., display 226) adapted to be held by user 290 while user 290 views the display. In other embodiments, housing 240 may be mounted to a mobile structure using a fixed or actuated mount to provide a fixed or actuated view relative to an orientation of mobile structure 101. In some embodiments, system 220 may be implemented as a wearable device, such as a pair of glasses including a plurality of displays configured to provide the same image to each eye of user 290 individually or to provide stereoscopic imagery to both eyes of user 290.

Figure 2B:
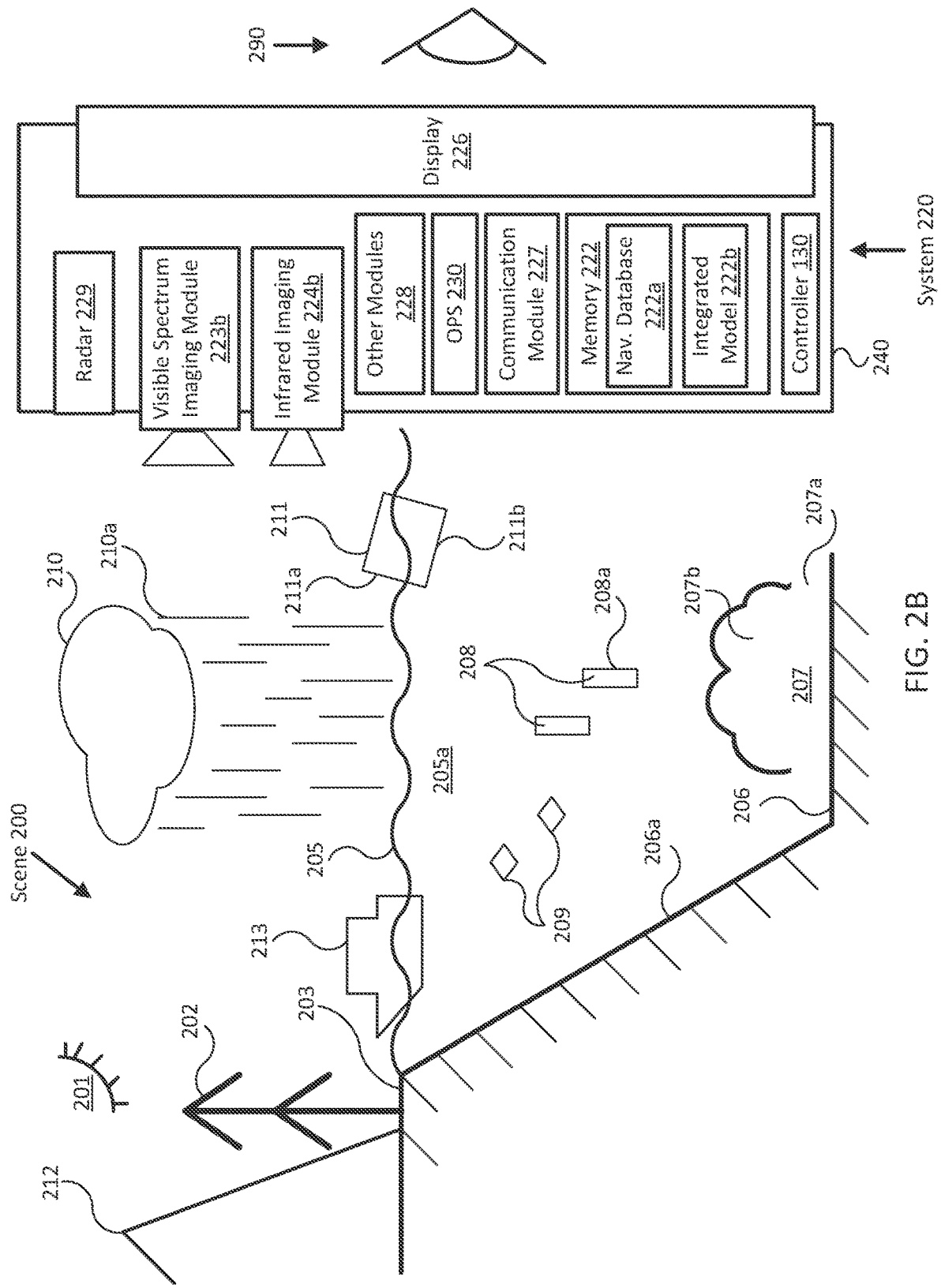
FIG. 2B illustrates a diagram of a sensor fusion navigational system operating in an example environment in accordance with an embodiment of the disclosure.

FIG. 2B illustrates a diagram of a sensor fusion navigational system operating in an example environment in accordance with an embodiment of the disclosure. As shown in FIG. 2B, system 220 is similar to system 220 in FIG. 2A, but with particular emphasis on visible and IR imaging of scene 220 as compared to LIDAR and sonar in FIG. 2B. For example, in the embodiment shown in FIG. 2B, system 220 may be configured to provide visible spectrum imagery (e.g., using a visible spectrum imaging module 223*b*), infrared spectrum imagery (using infrared imaging module 224*b*), sonar imagery (using sonar system 110 of FIGS. 1A and 1B—implemented as one of other modules 228), and/or radar imagery (using radar system 229) of scene 200 to a user 290 viewing a display 226. System 220 may be configured to display rendered image data (e.g., provided by imaging modules 223*b* and/or 224*b*) and/or radar data in a portion of a field of view (FOV) of display 226 that is above waterline 205 and to display rendered sonar data in a portion of the FOV that is below waterline 205.

Image data provided by imaging modules 223*b* and/or 224*b* as well as radar data provided by radar 229 may include an image of a surface of a body of water 205*a* and various objects or structures above waterline 205, such as the sun 201, a tree 202, a beach 203, a hill 212, cloud 210, rain 210*a*, floating object 211 or floating object 211*a* (the part of the floating object 211 above the waterline), and/or vehicle 213. Such image data may be processed using feature/pattern recognition techniques to determine a location of waterline 205 within the image data (e.g., if imaging modules 223*b* and/or 224*b* are oriented to capture a portion of scene 200 including waterline 205). Sonar data, which may be provided by bathymetric charts and/or past or current use of sonar system 110 of FIGS. 1A and 1B, may include data representative of waterline 205, a floor 206 of body of water 205*a*, a bank 206*a* of floor 206, a bottom feature 207 (e.g., a rock or sunken ship), fish 208 (or other fish, game, wildlife, and/or other flora and fauna), other submerged objects 209 (e.g., trash, seaweed), floating object 211*b* (the part of the floating object 211 below the waterline), and/or other underwater features within or surrounding body of water 205*a*.

A sea state of the body of water 205*a* may also be determined using image data from imaging modules 223*b* and/or 224*b*. For example, as shown in FIG. 2B, waterline 205 may be choppy. Analysis of the visual and/or thermal imaging data from the visible imaging module 223*b* and/or the infrared imaging module 224*b* may determine the choppiness of waterline 205 and, thus, determine at least a portion of the sea state of body of water 205*a*. In certain embodiments, such a sea state (e.g., sea calmness or choppiness) may be rendered or communicated within an integrated model by, for example, graphical representations (e.g., animating the sea state in a 2D or 3D manner or through representations of the sea state using sea state indicators) or textual representations (e.g., text describing the sea state or rating the sea state according to a sea state scale such as a numerical scale). Data from the modules within system 220 or system 100 may be combined within navigational database 222*a*, as described herein. For the purposes of this disclosure, any and all data that may directly or indirectly aid in the navigation of a vehicle may be considered navigational data. Also, the navigational database may combine navigational data of navigational sensors from any or all appropriate sources. The navigational database may also include orientation and/or position data from and/or associated with the navigational sensors. In certain embodiments, the navigational database may receive data from other sensors via communication module 227.

For example, navigational database 222*a* may include data from sonar system 110, visible spectrum imaging module 223*b*, infrared imaging module 224*b*, radar 229, and/or other navigation sensors of system 220. Controller 130 may be configured to generate an integrated model (e.g., integrated model 222*b*) from at least some of the data within navigational database 222*a*. In certain embodiments, integrated model 222*b* may combine data from multiple sensors, such as, for example, data from sonar system 110, visible spectrum imaging module 223*b*, infrared imaging module 224*b*, and/or radar 229. Integrated model 222*b* may combine data from multiple sensors into one view. Integrated model 222*b* may comprise a rendering of a virtual representation of the environment (e.g., render the environment from scratch, such as with a full 3D model) or may use data from one or more sensors as a base view and render additional data "on top" of the base view, such as in an overlay with variable transparency, for instance.

For example, data from visible spectrum imaging module 223b may be selected for the base view and data from infrared imaging module 224b, sonar system 110, and/or radar 229 may be rendered "on top" of the base view. Accordingly, using the example of the scene 200 in FIG. 2B, the base view may be a visual view from visible spectrum imaging module 223b. Due to rain 210a, visible spectrum imaging module 223b may not be able to detect vehicle 213 behind rain 210a. However, radar 229 and/or infrared imaging module 224b may be able to detect vehicle 213 through rain 210a. Thus, in a certain embodiment of the integrated model, the radar image and/or the thermal image of vehicle 213 may be included in the view of the visible image from visible spectrum imaging module 223b. Thus, the integrated model may, in addition to displaying data from visible spectrum imaging module 223b, also overlay radar and/or thermal image of vehicle 213 within the integrated model. Accordingly, an operator/user may be aware of the presence of vehicle 213 even though vehicle 213 may not be visible in the visual spectrum. Additionally or alternatively, features detected by sonar system 110 may also be incorporated into the integrated model, as described herein.

In various embodiments, integrated model 222b may be generated from the navigational database 222a and shown on display 226. The portions of any of image data from visible spectrum imaging module 223b and infrared imaging module 224b, sonar data from sonar system 110, radar data from radar 229, GNSS data from the GNSS 146, and other data from other navigational sensors that are rendered and displayed by display 226, and the techniques used to render the imagery, may be selected based on a point of view of display 226 to provide a view fusing the data of multiple navigational sensors.

Such fusing may be demonstrated in an example where the position of mobile structure 101 is determined. In certain embodiments, the resolution of GNSS data may result in positional errors of multiple feet. Additionally, connection to various GNSS satellites may be periodically lost and GNSS 146 may be miscalibrated or otherwise inaccurate. In such instances, system 100 and/or 220 may utilize data from other sensors to complement or supplement the GNSS data. For example, image data, sonar data, and/or radar data may be used to help determine the position of mobile structure 101. Such data may allow controller 130 to analyze the data and determine the position of mobile structure 101 according to the data.

For example, controller 130 may roughly determine the position of mobile structure 101 from current or outdated GNSS data, determine landmarks in the environment around mobile structure 101, and then may use image, sonar, and/or radar data to locate such landmarks within the data. Controller 130 may then determine the distance from mobile structure 101 to one or more such landmarks and, thus, determine the location of mobile structure 101. In certain such embodiments using image data, there may be a plurality of visual and/or thermal imaging modules 223b and/or 224b. The plurality of imaging modules may be configured to allow the controller to determine a distance of mobile structure 101 to the landmark imaged. In such embodiments, visual and/or thermal imaging modules 223b and/or 224b may additionally include corresponding OPSs. The orientation and/or position data from the OPSs may also aid in determining the position of mobile structure 101.

As shown, system 220 may include one or more controllers 130 (e.g., including memory 222), imaging modules (e.g., visible spectrum imaging module 223b and/or infrared imaging module 224b), other sensors (e.g., orientation and/or position sensor 230), display 226, communication module 227, and/or other modules 228 facilitating operation of system 220, which may or may not all be disposed within a common housing 240.

Visible spectrum imaging module 223b and infrared imaging module 224b may be electronic devices configured to capture imagery/image data of scene 200 according to their respective spectrums and provide images/image data to controller 130 and/or memory 222. In some embodiments, visible spectrum imaging module 223b and infrared imaging module 224b may be implemented according to any similar devices described in U.S. patent application Ser. No. 14/138,058, filed Dec. 21, 2013, and entitled "COMPACT MULTI-SPECTRUM IMAGING WITH FUSION", which is hereby incorporated by reference in its entirety. Moreover, imagery provided by imaging modules 223b and 224b may be combined (e.g., blended, overlaid, fused, or otherwise combined) to provide combined (e.g., from multiple source spectrums) imagery/image data that may be rendered by system 220 and/or displayed using display 226 using any of the methods described in U.S. patent application Ser. No. 14/138,058 (incorporated by reference above) and/or as further described herein.

More generally, system 220 may include a variety of imaging modules adapted to capture imagery (e.g., image and/or video data) according to visible spectrum, infrared, and other spectrums, for example, and provide corresponding image data to controller 130 or other controllers or devices for rendering and/or display. In some embodiments, imaging modules 223b and/or 224b may be mounted to a mobile structure separate from system 220 (e.g., to deck 106b or mast/sensor mount 108b of mobile structure 101 in FIG. 1B, using a fixed or actuated mounts such as imager cluster 161) and be configured to provide imagery to controller 130 using wired and/or wireless communications through communication module 227. In such embodiments, multiple devices may be configured to share image data provided by imaging modules mounted to mobile structure 101.

In some embodiments, controller 130 may be in communication with various modules of system 220 and be configured to receive imagery/image data of scene 200 from imaging modules 223b and/or 224b, determine waterline 205 of a body of water 205a in scene 200 (e.g., from image data, position data, and/or orientation data provided by the device), render or display image data in any portion of an FOV of display 226 that extends above waterline 205, and/or render and/or display sonar data in any portion of the FOV of display 226 that extends below waterline 205. In certain embodiments, memory 222 may include data such as, for example, navigational database 222a and/or integrated model 222b.

In the embodiment shown in FIG. 2B, system 220 includes OPS 230. In some embodiments, controller 130 may be configured to receive the sonar data, the radar data, and/or image data based on a measured position and/or orientation provided by OPS 230. OPS 230 may be implemented as one or more orientation sensors, GNSS sensors, differential GNSS sensors, orientation/position reference transducers and/or optical sensors (e.g., for actuators), visible spectrum and/or infrared imaging modules, and/or other sensors configured to measure a relative and/or absolute orientation and/or position of system 220 and/or each of imaging modules 223b and 224b and display 226 and provide such measurements to controller 130. For example, in one embodiment, OPS 230 may include one or more remote infrared imaging modules (e.g., implemented similar to infrared imaging module 224b) fixed to a mobile structure and a number of infrared registration marks disposed on housing 240, and controller 130 may be configured to determine a relative position and/or orientation of system 220 from the size and/or position of the infrared registration marks and/or other related characteristics of system 220 in image data captured by the one or more remote infrared imaging modules. Such relative position and/or orientation may be relative to a position and/or orientation of the remote infrared imaging modules and/or mobile structure 101.

In some embodiments, OPS 230 may be distributed amongst the various modules of system 220 and include one or more individual module OPSs configured to measure orientations and/or positions of image modules 223b and/or 224b, radar 229, other ranging sensors, and/or a separate display OPS configured to measure a position and/or orientation of display 226. In various embodiments, controller 130 may be configured to combine image data and sonar data according to OPS measurements and/or measurements of an orientation and/or position of a coupled sonar system (e.g., from a corresponding OPS) and/or mobile structure to produce combined imagery, such as visible spectrum images of scene 200 above waterline 205 and/or three dimensional sonar images of scene 200 below waterline 205. In other embodiments, controller 130 may be configured to use orientation and/or position measurements of system 220, imaging modules 223b and 224b, radar 229, display 226, other ranging sensors, and/or mobile structure 101 to control one or more actuators to adjust a position and/or orientation of imaging modules 223b and 224b and/or portions of an associated sonar system (e.g., transducer assembly 112) to image or ensonify a particular position and/or orientation of scene 200 relative to an FOV of display 226. In various embodiments, controller 130 and memory 222 may be integrated together, for example, or may be implemented in a distributed manner across a number of individual controllers and/or memories.

Display 226 may be configured to display image data from imaging modules 223b and 224b, sonar data (e.g., from sonar system 110 of FIGS. 1A and 1B), radar data, integrated model 222b rendered by controller 130, and/or other image data, to user 290. In various embodiments, display 226 may be characterized by an FOV that is a function of the available pixel dimensions of display 226, the position and/or orientation of display 226, the FOVs of imaging modules 223b and/or 224b, an effective optical zoom level applied to the image data provided by imaging modules 223b and/or 224b, and/or similar characteristics of other navigational and/or ranging sensors. For example, where imaging modules 223b and 224b are within the same housing 240 as display 226, the position and orientation of display 226 may be substantially the same as that of imaging modules 223b and/or 224b, and the FOV of display 226 may be the same as that for imaging modules 223b and/or 224b as modified by the effective zoom level and the pixel dimensions of display 226. In other embodiments, where imaging modules 223b and/or 224b are mounted outside of housing 240, the FOV of display 226 may be dependent on the absolute or relative position and/or orientation of display 226 as compared to that of imaging modules 223b and/or 224b. In some embodiments, the effective optical zoom level may be adjusted using digital image processing techniques, manual and/or actuated adjustment of optical components within imaging modules 223b and/or 224b, or any combination of image processing or optical adjustments.

In various embodiments, system 220 may be implemented as a wearable device, such as a pair of glasses including a plurality of displays configured to provide the same image to each eye of user 290 individually or to provide stereoscopic imagery to both eyes of user 290. Such stereoscopic imagery may be generated using multiple instances of imaging modules 223b and/or 224b, for example, or by applying various image processing techniques to image and/or sonar data to provide a simulation of depth.

Figure 3:
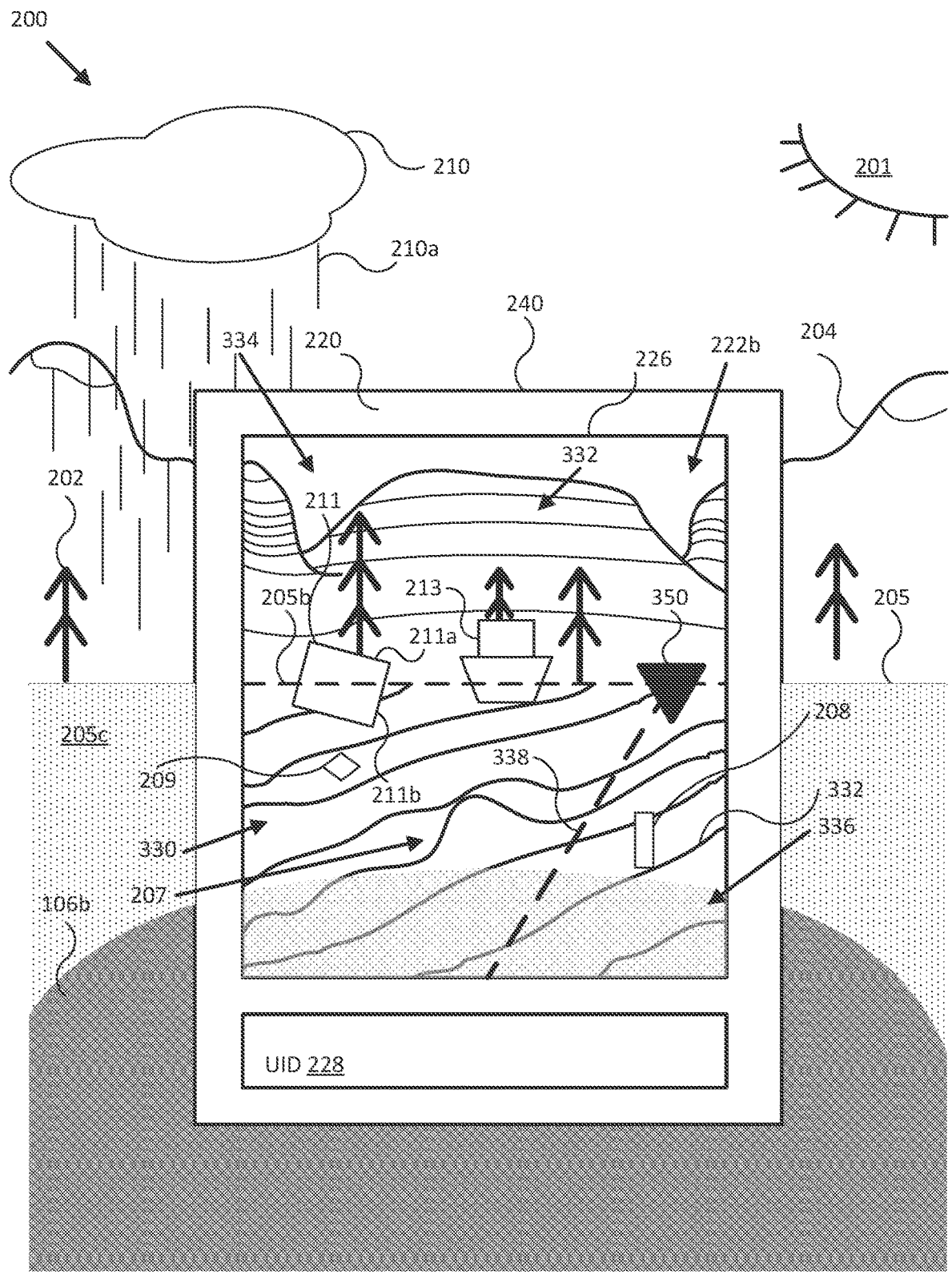
FIG. 3 illustrates a diagram of a display of a sensor fusion navigational system in accordance with an embodiment of the disclosure.

FIG. 3 illustrates a diagram of a display of a sensor fusion navigational system in accordance with an embodiment of the disclosure. In the embodiment shown in FIG. 3, system 220 is oriented to illustrate imagery as integrated model 222b that is displayed by display 226 as viewed by user 290 of FIG. 2B, where the effective optical zoom level is adjusted to reproduce a direct view of scene 200 (except for a relatively small portion of the direct view obscured by housing 240 and/or user input device 228.

Scene 200 includes features above waterline 205 illustrated in FIG. 2B and additionally includes mountains/land features 204, tree 202, vehicle 213, floating object 211a, surface 205c of body of water 205a, and deck 106b (e.g., of mobile structure/boat 101 in FIG. 1B). Also shown in FIG. 3, and in particular in the FOV of display 226, are detected waterline 205b, portion 330 of the FOV that extends below waterline 205b, and portion 334 of the FOV that extends above waterline 205b. System 220 may in some embodiments be configured to render detected waterline 205b in display 226 to illustrate a detected location of waterline 205 relative to the FOV of display 226. Portion 330 may include imagery representing bottom feature 207, fish 208, submerged object 209, and the submerged portion of the floating object 211b similar to objects illustrated in FIG. 2B. For example, as shown in FIG. 3, portion 330 may include a number of contour lines 332 rendered by a controller (e.g., controller 130 of FIG. 2B) to distinguish depths, relative distances, various characteristics of bathymetric data, and/or other characteristics of underwater features. Additionally or alternatively, contour lines 332 may be rendered by the controller in portion 334 above the waterline. The contour lines 332 above the waterline 205 may distinguish elevation, relative distances, and various other characteristics of terrestrial features.

Alternatively or additionally, portion 330 may include icons and/or other types of graphical indicators configured to illustrate a position and/or distance to fish 208, submerged object 209, floating object 211b and/or to distinguish between the various objects (e.g., based on fish detection processing performed on acoustic returns from fish 208, submerged object 209, and/or floating object 211b). For example, icon 350 may be rendered to show a planned destination for mobile structure 101. The planned destination may be a destination inputted into the controller by a user. Additionally, suggested route 338 may also be rendered. Suggested route 338 may be a route determined by the controller to best guide the operator (who may or may not be the user) of mobile structure 101 to the planned destination indicated by the icon 350.

In certain embodiments, the controller may use data from one or more sensors to offer an enhanced view. For example, in FIG. 3, rain 210a may be present. However, display 226 may combine information from a plurality of sensors and render the scene 200 in display 226 without the presence of rain 210a. In certain embodiments, the controller may be able to "see through" the rain by, for example, using radar data or image data and determining the presence of rain and so removing the rain from the image. In certain such embodiments, the controller may distinguish between rain or other weather (such as fog, win, etc.) that may not have an effect on navigation and rain or other weather that may have an effect on navigation. For example, the controller may, from sensors that may detect wind speed, third party weather data, or weather data from other vessels and installations, determine whether rain and/or other weather data is representative of a storm (e.g., a hurricane) or other bad weather condition. In such cases, the controller may then render the weather, graphics indicative of the weather, or a warning on display 226 to warn the user of the weather. In other embodiments, the controller may render the weather, graphics indicative of the weather, or messages to indicate the weather even if the weather data does not indicate that the weather conditions are representative of that of a storm or other bad weather.

In certain embodiments, the controller may additionally be configured to forecast future weather conditions around mobile structure 101 from the weather data and/or other data. For example, the controller may use the weather data from the sensors as well as data indicating weather conditions around mobile structure 101 to forecast future weather conditions. In such an embodiment, data indicating wind speed, the position of the sun, the location of mobile structure 101, the positioning of the clouds, the barometric pressure, current and historical precipitation, and other environmental factors may all be considered in forecasting future weather conditions.

Although the FOV of display 226 in FIG. 3 is shown to include both portions 330 and 334, a different position and/or orientation of display 226 and/or system 220 could result in portion 330 or 334 encompassing the entire FOV of display 226. In certain embodiments, portions 330 and 334 may be rendered in different manners (e.g., with 3D graphics for the portion 334 and with contour lines for the portion 330) and/or rendered with data from different sensors or from a combination of sensors. In other embodiments, portions 330 and 334 may be rendered in the same manner (e.g., with contour lines for both portions) and/or rendered with data from the same sensors.

In some embodiments, age or source of sonar data may be differentiated by rendering substantially real time sonar data differently from prior-acquired and/or survey map sonar data (e.g., a 3" party provided chart or collection of bathymetric data for a particular body of water stored in memory, such as memory 222 of FIG. 2B). For example, substantially real time sonar data may be rendered in color and prior-acquired and/or survey map sonar data may be rendered in greyscale. In some embodiments, a relative age of once real time sonar data may be indicated by reducing a chrominance level of the sonar data as the sonar data ages. In additional embodiments, system 220 (e.g., controller 130 of FIG. 2B) may be configured to detect or determine various surfaces of underwater features based on acoustic returns from the surfaces and/or one or more volumetric renderings of corresponding sonar data, and the relative or absolute orientations of the various surfaces may be determined from the volumetric renderings. In such embodiments, system 220 may be configured to indicate the relative or absolute surface orientations in portion 330 by mapping the surface orientations to a color and/or intensity map and rendering the sonar data corresponding to the determined surfaces in a corresponding color. In addition, 3" party provided charts and/or bathymetric data may be updated with sonar data and/or any other data received by the controller 130. As charts may contain errors, using the sonar data to update the charts may allow for such errors to be corrected.

Also shown in portion 330 of the FOV of display 226 is overlapping portion 336, which indicates where deck 106b would otherwise obscure direct view of surface 205c. In some embodiments, system 220 may be configured to determine whether portion 330 overlaps with a view of a mobile structure disposed on surface 205c (e.g., mobile structure 101 of FIG. 1A or 1B), thereby forming overlapping portion 336. If overlapping portion 336 exists, system 220 may be configured to blend image data of mobile structure 101 (e.g., captured by imaging modules 223b and/or 224b) with sonar data in overlapping portion 336 and rendering the blended data in the overlapping portion 336. In embodiments where system 220 is worn by a user and generally occludes direct view of the user's surroundings, the blended imagery can provide a user with a view of sonar data beneath mobile structure 101 but protect the user from stumbling into objects on mobile structure 101 and/or walking off deck 106b.

Display 226 may also show vehicle 213 and/or floating object 211. In certain embodiments of display 226, the controller may recognize that vehicle 213 and/or floating object 211, as well as other objects, overlaps portion 334 above waterline 205 and portion 330 below waterline 205. In certain such embodiments, the controller may render vehicle 213 and/or floating object 211 as one object (by fusing data from multiple sensors) and/or render the vehicle 213 and/or the floating object 211 using data from a single sensor instead of rendering the above water and underwater portions of the vehicle 213 and/or the floating object 211 in different manners and/or using different data from different sensors to determine the above water and underwater portions of the respective objects. In certain other embodiments, the vehicle 213 and/or the floating object 211 may be rendered in different degrees of transparency so that terrain features behind the vehicle 213 and/or the floating object 211 (such as the tree behind the objects in FIG. 3) may be viewable by the user. In certain such embodiments, the user may select the level of transparency of vehicle 213 and/or floating object 211 rendered within display 226.

Figure 4:
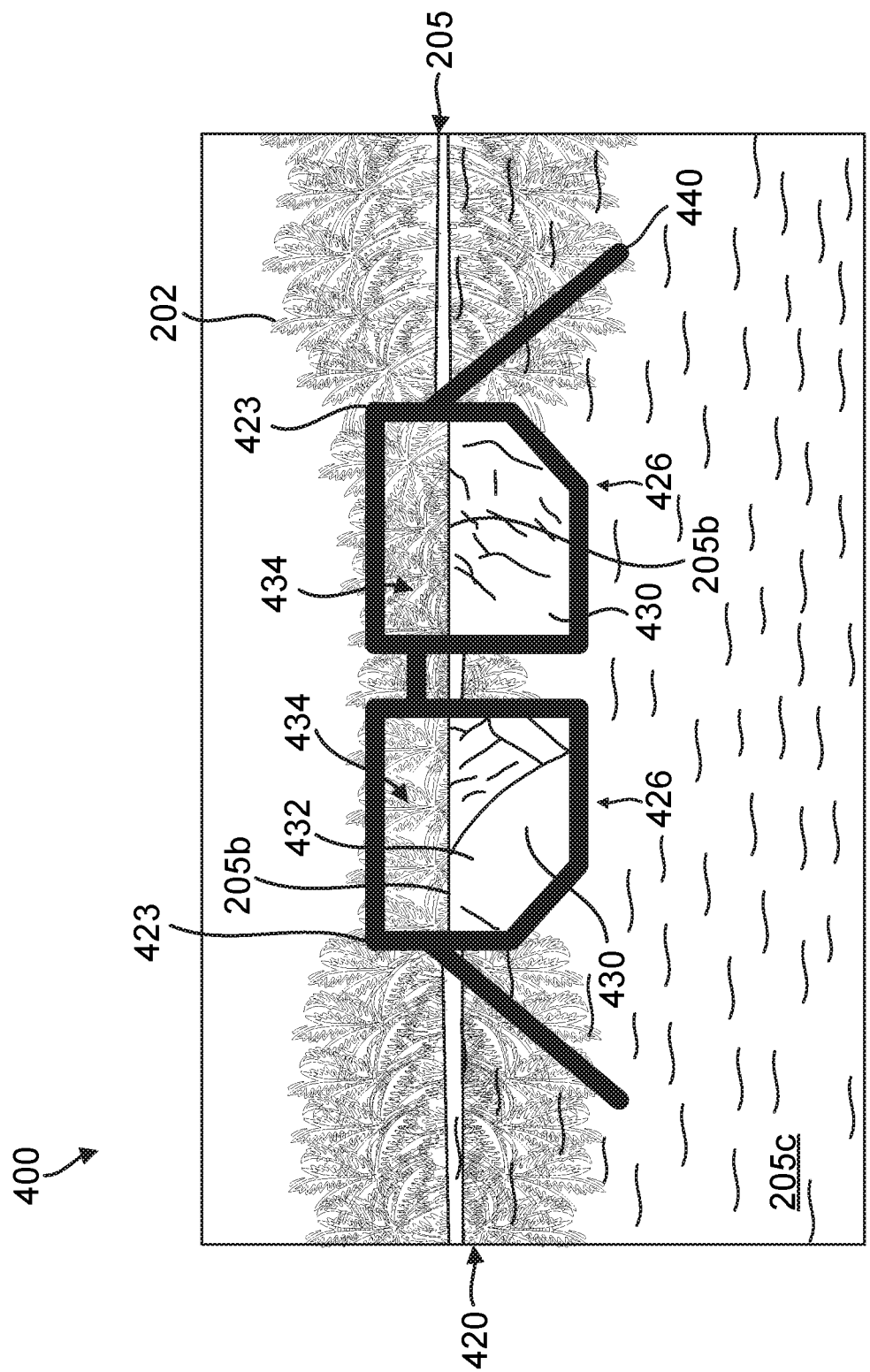
FIG. 4 illustrates a diagram of an augmented reality sensor fusion navigational system in accordance with an embodiment of the disclosure.

FIG. 4 illustrates a diagram of an augmented reality sensor fusion navigational system in accordance with an embodiment of the disclosure. In various embodiments, portable imaging device 420 may be implemented with similar functionality as that described with reference to system 220 in FIGS. 2 and 3. In the embodiment shown in FIG. 4, wearable portable imaging device 420 is oriented to illustrate imagery displayed by displays 426 (e.g., one per user eye) as viewed by a user wearing portable imaging device 420, where the effective optical zoom level is adjusted to reproduce a direct view of scene 200 (except for a relatively small portion of the direct view obscured by imaging modules 423 and/or frame 440).

FIG. 4 includes some of the features above waterline 205 illustrated in scene 200 of FIGS. 2 and 3, and, in particular in the FOV of displays 426, includes detected waterlines 205b, portions 430 of the FOV that extend below respective waterlines 205b, and portions 434 of the FOV that extend above respective waterlines 205b. Portions 430 may include color and/or intensity shading 432 rendered by a controller (e.g., controller 130 of FIG. 2B) to distinguish depths, relative distances, various characteristics of bathymetric data, and/or other characteristics of various underwater features.

As illustrated in FIG. 4, wearable portable imaging device 420 may include one or more imaging modules 423, which may be implemented as visible spectrum and/or infrared imaging modules configured to provide monocular (e.g., copied to both displays 426) and/or stereoscopic image data depending on the number and arrangement of imaging modules and the type of image processing applied to image data provided by imaging modules 423. In addition, an OPS (e.g., OPS 230 of FIG. 2B) may be integrated with any of imaging modules 423, displays 426, and/or frame 440 and be configured to provide a position and/or orientation of one or more of the features to facilitate determining FOVs for displays 426. In some embodiments, portable imaging device 420 may be configured to determine portion 430 of the FOV of display 426 and use an OPS and actuator in an associated transducer assembly (e.g., actuator 116 coupled to transducer assembly 112 of sonar system 110 in FIG. 1B) to ensonify at least a subset of portion 430 substantially in real time as a user adjusts a position or orientation of wearable portable imaging device 420 by, for example, moving the user's head. Sonar data provided by the associated transducer assembly may be rendered using position data and/or orientation data provided by the OPS to correlate the sonar data with portion 430, for example, and/or to facilitate other rendering processing described herein.

In some embodiments, displays 426 may be implemented with substantially transparent display panels, where the only portions of displays 426 that obscure a direct view of scene 200, as seen by a user wearing portable imaging device 420, are those portions actively displaying rendered image data. In such embodiments, portable imaging device 420 may be configured to render and display portions 430 and/or detected waterlines 205b using displays 426 without also rendering portions 434. Power for portable imaging device 420 may be embedded within frame 440 and/or electrically coupled to portable imaging device 420 through use of a wire harness and/or an external power source, such as a battery pack or a power source for a mobile structure.

Figure 5:
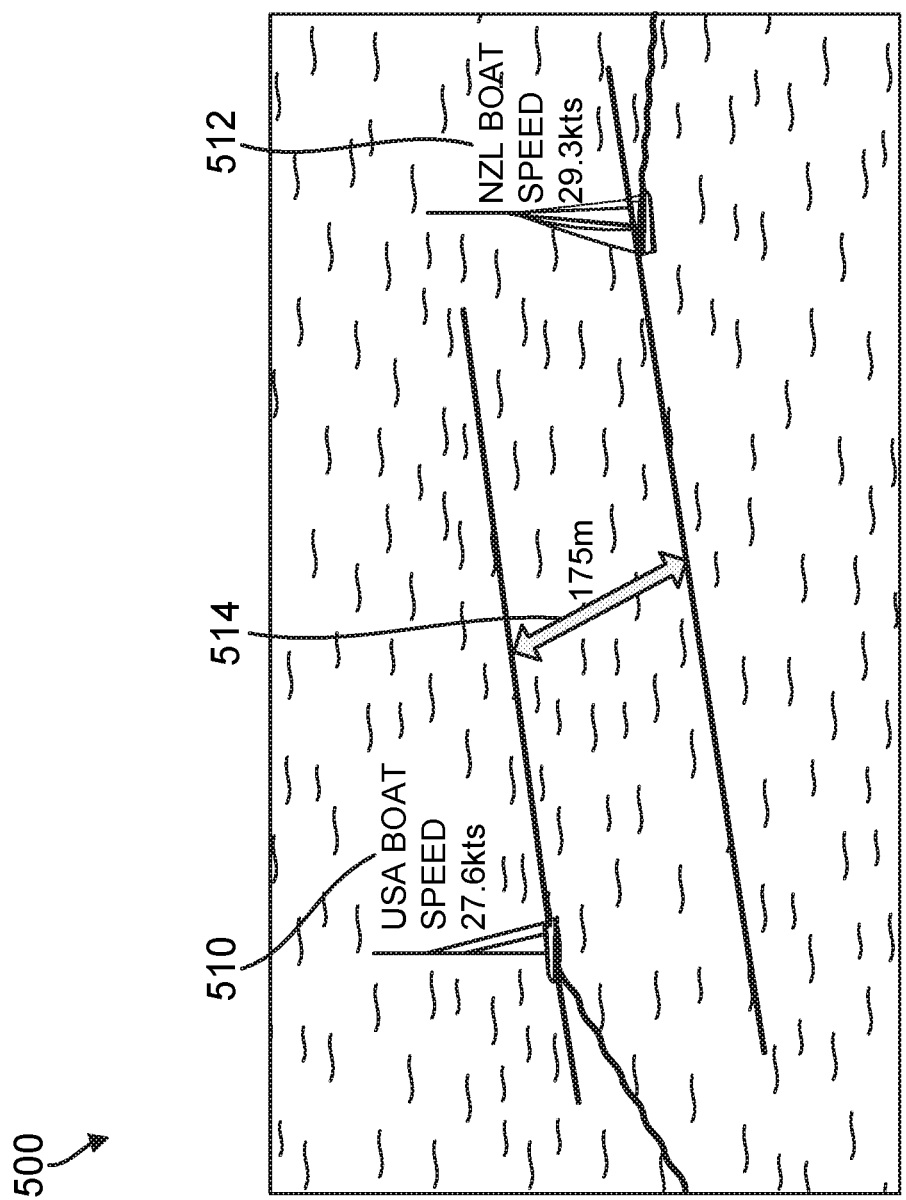
FIG. 5 illustrates a diagram of an information display of a sensor fusion navigational system in accordance with an embodiment of the disclosure.

FIG. 5 illustrates a diagram of an information display of a sensor fusion navigational system in accordance with an embodiment of the disclosure. Information display 500 of FIG. 5 may be a rendering by a display or a portion of a display. Information display 500 shown in FIG. 5 may include a first vessel 510, a second vessel 512, and information graphic 514. In certain embodiments, the rendering shown in FIG. 5 may be a 2D or 3D graphic rendering showing the scene from a view different from the point of view of the user, who may be located on a mobile structure, for example.

FIG. 5 shows information display 500 that may fuse data from multiple sensors. For example, the position of the first vessel 510 and the second vessel 512 may be determined from AIS data, radar image, image data, sonar data, GNSS data, and/or other types of data. Additionally, the country of registry of the first vessel 510 and the second vessel 512 may be determined through such navigational data or other navigational data. The country of registry of the first vessel 510 and/or the second vessel 512 may then be rendered in the display within the vicinity of the first vessel 510 and/or the second vessel 512. Other data, such as the speed of each vessel, may also be determined from navigational data (e.g., from radar data, sonar data, or from AIS data) and rendered.

Additionally, information display 500 in FIG. 5 may also display the distance between first vessel 510 and second vessel 512. The distance between first vessel 510 and second vessel 512 may be determined from certain navigational data (e.g., radar data, image data, AIS data, sonar data, and other navigational data). The distance between first vessel 510 and second vessel 512 may be displayed by information graphic 514. Information graphic 514 may be rendered in a fashion designed to be easily viewable by a user. For example, the font of the information graphic 514 may be selected to be easily readable and the color of the font may be selected, and possibly changed, to be easily distinguishable from the background.

Various other embodiments may display other information with other information graphics. For example, an embodiment may display the relative velocities of the two vessels, or may display the rate of change between the distances of the two vessels. The display may present any information that may be determined by a controller with the information graphic.

Figure 6:
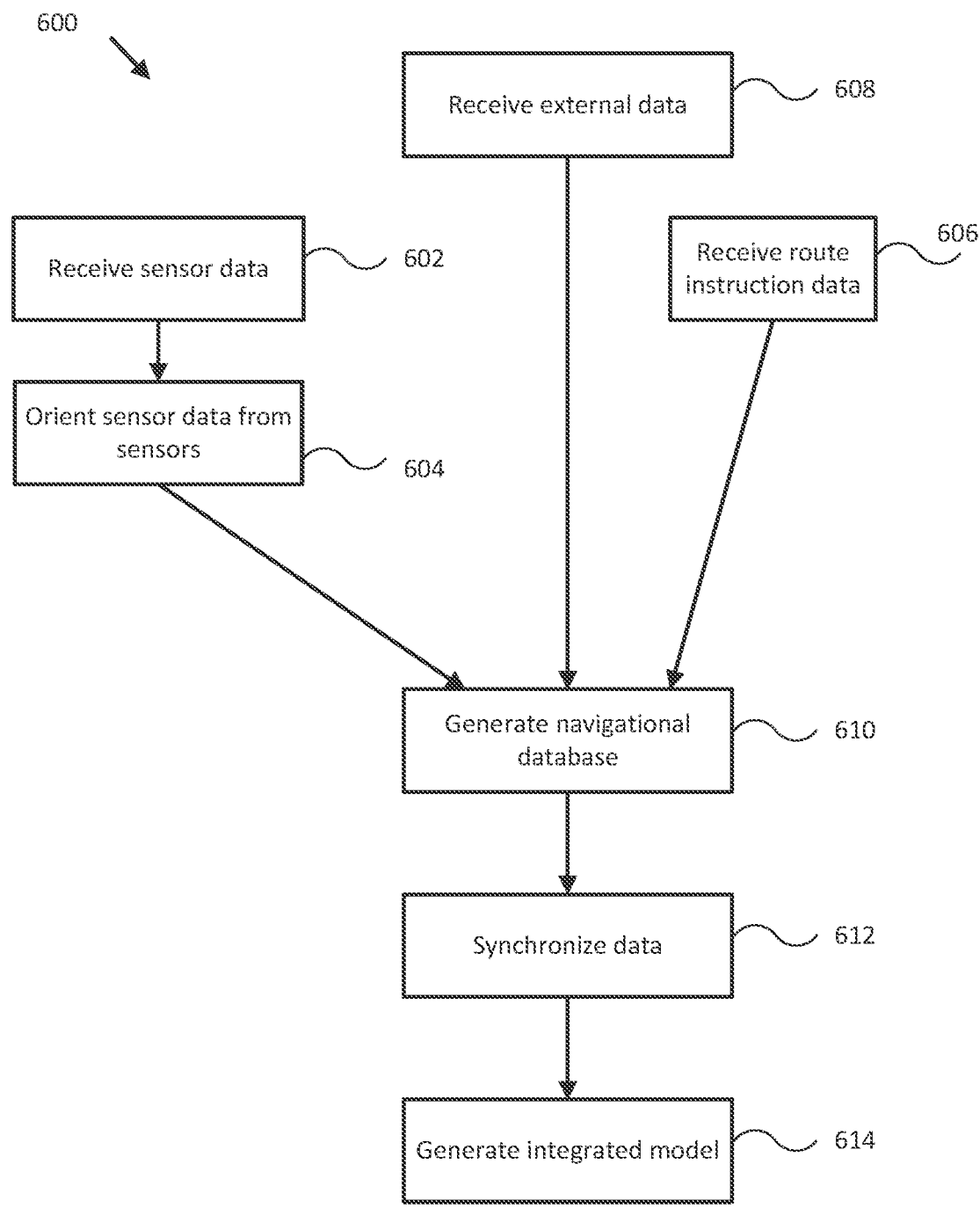
FIG. 6 illustrates a flowchart of a process for sensor fusion for navigational systems in accordance with an embodiment of the disclosure.

FIG. 6 illustrates a flowchart of a process for sensor fusion for navigational systems in accordance with an embodiment of the disclosure. It should be appreciated that any step, sub-step, sub-process, or block of process 600 may be performed in an order or arrangement different from the embodiments illustrated by FIG. 6. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 600 is described with reference to systems described in reference to FIGS. 1-5 and 7, process 600 may be performed by other systems different from those systems and including a different selection of electronic devices, sensors, assemblies, mobile structures, and/or mobile structure attributes.

In block 602, sensor data is received. For example, controller 130 may be configured to receive navigational data from sonar system 110, sensors 140-146, a radar or other ranging sensor system (e.g., other modules 180), and/or other sensors. In some embodiments, such navigational data may include corresponding position and/or orientation data, as described herein.

In block 604, sensor data from the sensors is oriented. For example, controller 130 may be configured to orient sensor data using, for example, data from an OPS of a sensor to determine an orientation and/or position of such a sensor. Such an OPS may generate orientation and/or position data and such orientation and/or position data may then be integrated into the navigational data and/or sent along with navigational data from the sensor to be used to orient sensor data.

In block 606, route instruction data is received. For example, controller 130 may be configured to receive route instruction data that may be related to the route of mobile structure 101. Such route instruction data may be input by a user, from a remote device, or from some other source. Route instruction data may inform controller 130 of a destination and, in response, controller 130 may then determine, for example, a route for mobile structure 101. Such a route may be determined using distance, time, weather conditions, sea conditions, the location of other mobile structures, jurisdiction considerations, as well as other factors. Route instruction data may contain information related to one destination or multiple destinations.

In block 608, external data is received. For example, controller 130 may be configured to receive external data. The external data may be any data not generated by sensors mounted on mobile structure 101. For example, image data from devices not mounted on mobile structure 101, GNSS and/or other position data from other mobile structures, and data from the internet may all be received by the controller. Such data may aid in at least one aspect of navigating mobile structure 101.

In block 610, a navigational database is generated. For example, controller 130 may be configured to generate navigational database 222a, which may include sensor data, external data, route instruction data, orientation and/or position data, as well as other data. The navigational database may fuse together data from multiple sensors.

In block 612, data is synchronized. For example, controller 130 may be configured to synchronize data within navigational database 222a. Such data may be synchronized by, for example, grouping sensor data according to corresponding orientation and/or position data, grouping data obtained at substantially the same time (e.g., obtained within 1 second of each other), grouping data related to a similar aspect (e.g., grouping all data related to underwater features together), grouping data obtained from a particular sensor, multiple similar sensors, or from the same or similar source, grouping data according to user selection, and/or grouping data according to another methodology, for example, and/or otherwise synchronizing, partitioning, and/or grouping the data within navigational database 222a. Certain embodiments may additionally include multiple such groupings.

In block 614, an integrated model is generated. For example, controller 130 may be configured to generate integrated model 222b from navigational database 222a (generated in block 610). For example, some or all of data within navigational database 222a may be used to generate integrated model 222b. In some embodiments, integrated model 222b may be a 2D or 3D representation of the environment near and/or proximate mobile structure 101. As a non-limiting example, image data, sonar data, radar data, and/or other data within navigational database 222a may be used to generate integrated model 222b. In various embodiments, integrated model 22b may facilitate and/or include forecasting, compensating, and/or autopilot capabilities.

For example, controller 130 may be configured to determine if data from a sensor or multiple sensors are unavailable (e.g., sensor data from sensors mounted on mobile structure 101 such as the sonar data, the radar data, the visual imaging data, the thermal imaging data, data from environmental sensors, OPS data, and other data as well as data from external sources such as GNSS data, AIS data, and weather data). The controller may primarily generate an aspect of the integrated model from a certain sensor, but if the controller determines that data from the certain sensor is unavailable, the controller may, in response, substitute data from another sensor to generate the aspect of the integrated model. For example, in a certain embodiment, the controller may primarily use radar data to generate terrain of an environment around mobile structure 101 within an integrated model. However, if the controller determines that radar data is unavailable, it may generate the terrain of the environment around mobile structure 101 within the integrated model with visual image data by analyzing the visual image data to determine terrain features.

In some embodiments, image data, orientation and/or position data, and/or sonar data acquired and/or processed in blocks 602-614 may be used to control operation of a mobile structure 101, such as by controlling steering sensor/actuator 150 and/or propulsion system 170 to steer mobile structure 101 to avoid hazards and/or to follow a provided route, to steer mobile structure 101 according to an orientation of display 226, for example, and/or according to positions and/or depths of floor 206, bottom feature 207, fish 208, and/or submerged objects 209 as well as other terrain and weather features.

Figure 7A:
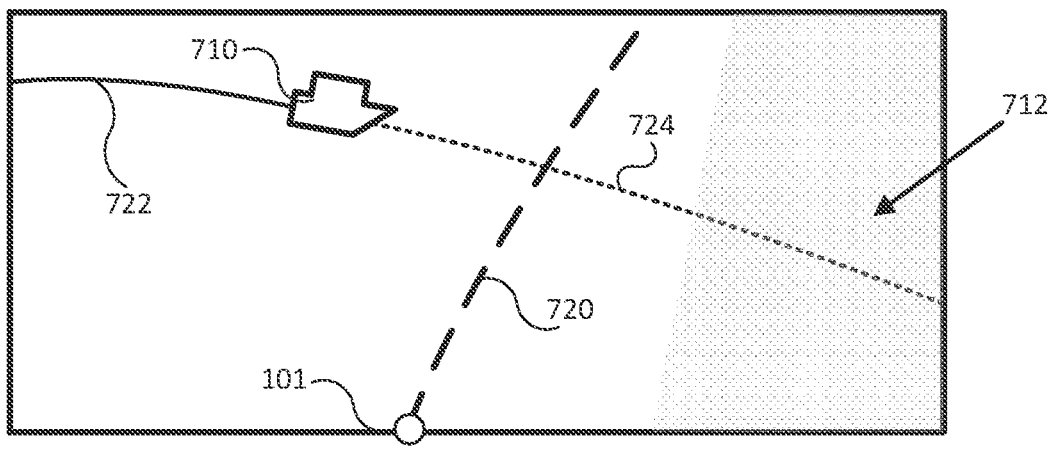
FIGS. 7A-C illustrate an adjusting sequence shown in a display of a sensor fusion navigational system in accordance with an embodiment of the disclosure.
Figure 7B:
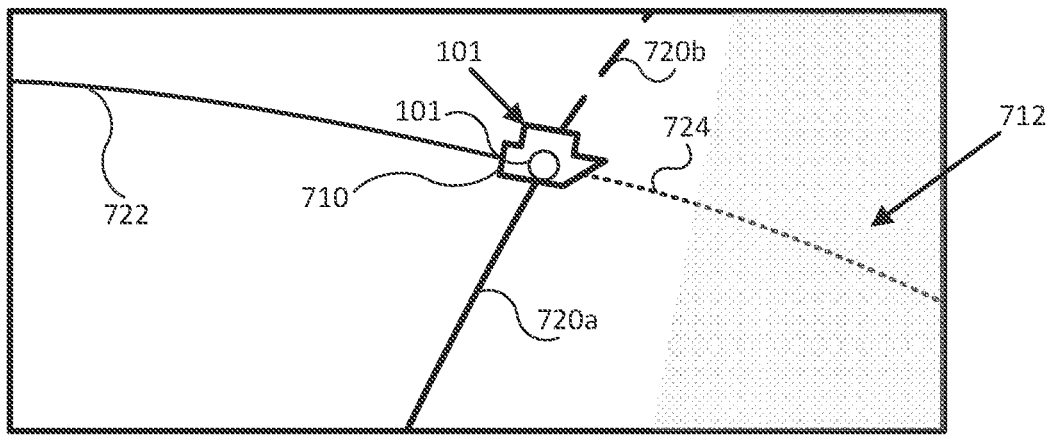
Figure 7C:
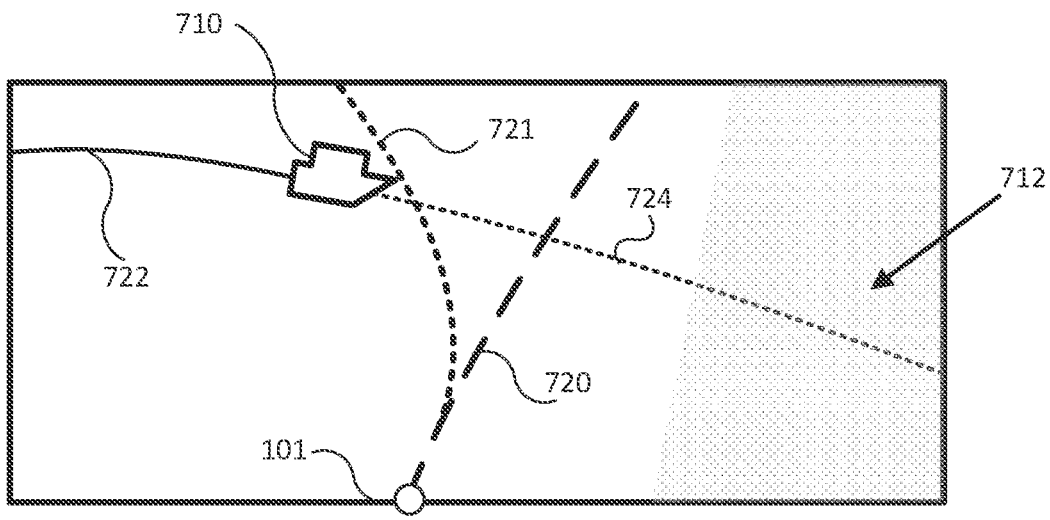

FIGS. 7A-C illustrate an adjusting sequence shown in a display of a sensor fusion navigational system in accordance with an embodiment of the disclosure. FIGS. 7A-C may include mobile structure 101, a vessel 710, a vessel traveled route 722, a vessel projected route 724, a suggested route 720, and an underwater hazard 712. The embodiments shown in FIGS. 7A-C may be generated from sensor data that may, for example, include a time of acquisition associated with the data. The time of acquisition may allow for construction of historical, current, and/or future views of integrated models.

In FIG. 7A, mobile structure 101 may be shown in its current position and a planned destination may have been entered. Suggested route 720 may be determined from such a planned destination. In FIG. 7A, suggested route 720 may be an initial or preliminary suggested route that may not, or may not yet have, taken into consideration projected route 724 of vessel 710.

Additionally in FIG. 7A, vessel 710 (a vessel separate from mobile structure 101) may be shown in its current known position. The current known position of vessel 710 may be determined from AIS data, radar data, image data, sonar data, or other navigational data contained with navigational database 222a. Vessel traveled route 722 may be determined from data of the position of vessel 710 from previous points in time. The data of the previous position of vessel 710 may be time stamped and may be contained within a navigational database.

FIG. 7A may also include vessel projected route 724. Vessel projected route 724 may be determined from navigational data received by a controller. For example, such navigational data may determine a planned destination of vessel 710 by, for example, data transmitted by vessel 710 or transmitted by a third party and controller 130 may then determine a vessel projected route 724 from the planned destination of vessel 710. In other embodiments, vessel projected route 724 may be determined from data communicated from vessel 710, from a third party, or from data preloaded on controller 130. Additionally or alternatively, controller 130 may determine vessel projected route 724 by forecasting from previous movements of vessel 710. Thus, controller 130 may, for example, forecast vessel projected route 724 of vessel 710 from vessel traveled route 722 taking into account a bearing of vessel 710, a speed of vessel 710, current conditions and other environmental conditions, and/or the presence of other vessels, borders, terrain, fixed structures, and mobile structures within the general vicinity of vessel 710.

In FIG. 7B, controller 130 may forecast a potential collision between vessel 710 and mobile structure 101 at point 730. Controller 130 in FIG. 7B may forecast the potential collision by, for example, predicting the location of vessel 710 at a future point in time by taking into account one, some, or all of vessel traveled route 722, the bearing of vessel 710, the speed of vessel 710, current conditions and other environmental conditions, and/or the presence of other vessels, borders, terrain, fixed structures, and mobile structures within the general vicinity of vessel 710.

FIG. 7B may be a predictive view that may be rendered within an integrated model shown in a display. In certain embodiments, the user may be able to fast forward and rewind between renderings showing the past, current, and future (e.g., forecasted) positions of mobile structure 101 (shown at the point of collision in FIG. 7B) and vessel 710.

In FIG. 7B, the solid line portion of suggested route 720*a* shows the path mobile structure 101 is predicted to have traveled by the time mobile structure 101 reaches point 730 in FIG. 7B (and collides with vessel 710) and the solid line portion of vessel traveled route 722 shows the path vessel 710 is predicted to have traveled by the time vessel 710 reaches point 730 and collides with mobile structure 101.

In FIG. 7C, controller 130 may return to the time shown in FIG. 7A and recommend an alternative route 721 to avoid collision with vessel 710. Alternative route 721 may be determined by taking into account any of the factors outlined above as well as other factors such as the characteristics of mobile structure 101 (e.g., the rate of longitudinal and lateral acceleration possible with mobile structure 101). In FIG. 7C, alternative route 721 may be determined by forecasting future positions of vessel 710 based on vessel 710's current bearing and speed as well as vessel 710's projected destination.

Additionally, underwater hazard 712 may be a factor in determining alternative route 721. Underwater hazard 712 may be a highlighted area within an integrated model that mobile structure 101 may be advised to avoid. Underwater hazard 712 may be, for example, a shallow portion of an ocean or a portion with obstacles that may potentially ground or damage mobile structure 101. Underwater hazard 712 may be determined through depth data, bathymetric data, sonar data, image data including thermal and visual image data, and other data. In certain embodiments, underwater hazard 712 may be determined by taking into account characteristics of mobile structure 101 (such as the ability of mobile structure 101 to turn or stop, or a draw of mobile structure 101). Accordingly, if mobile structure 101 requires a longer distance to decelerate or change directions, the area of underwater hazard 712 may be increased.

In certain other embodiments, controller 130 may continuously determine any underwater areas around the vicinity of mobile structure 101 that may include obstacles or be too shallow for mobile structure 101, even when no planned destination has been entered. The controller may do so using one or a combination of sonar data, bathymetric data, image data, GNSS data, and/or other data. Controller 130 may, for example, determine that a certain underwater area has a depth less than a minimum depth for mobile structure or determine obstacles (e.g., crab pots) within the underwater area. Controller 130 may do so by, for example, determining obstacles by sonar bounce back or analyzing images from a thermal imaging module to determine the presence of crab pots. Controller 130 may then project the likely path(s) of mobile structure 101 based on current heading, speed, and control inputs and determine if mobile structure 101 is likely to cross over any underwater areas that may include obstacles, be too shallow, or may offer a danger to mobile structure 101 in other ways. If so, Controller 130 may warn the operator/user of mobile structure 101 of any impending danger. Controller 130 may warn the user a set amount of time before any possible collision/danger may manifest, such as 30 seconds before, 1 minute before, 2 minutes before, or an amount of time before that allows mobile structure 101 to take evasive action (the amount of time possibly determined by the characteristics and/or speed of mobile structure 101).

Referring back to alternative route 721, alternative route 721 may be determined by controller 130 by taking into account the aforementioned factors as well as underwater hazard 712. Alternative route 721 may then be rendered within an integrated model and presented within a display. The operator of mobile structure 101 may then change the path of mobile structure 101 according to alternative route 721, or controller 130 of mobile structure 101 may automatically correct the bearing and speed of mobile structure 101 to match that of alternative route 721.

In various embodiments, controller 130 may be configured to apply various types of image processing to the sonar data when rendering an integrated model, such as processing to visually differentiate real time and prior-acquired sonar data, image data, radar data, and other data, to visually indicate a relative age of different portions of such data, to visually indicate surface orientations of above water and underwater features, and/or to provide additional methods to visually differentiate different above water and underwater features and/or different above water and underwater feature characteristics from one another. Similarly, in some embodiments, controller 130 may be configured to apply various types of image processing to image data when rendering the integrated model, such as processing to differentiate abovewater objects from one another in low light or otherwise limited visibility environments.

It is contemplated that any one or combination of methods to provide augmented reality sonar imagery may be performed according to one or more operating contexts of a control loop, for example, such as a startup, learning, running, and/or other type operating context. For example, process 600 may proceed back to block 602 and proceed through process 600 again to produce and updated navigational database and/or integrated model, as in a control loop.

Figure 8:
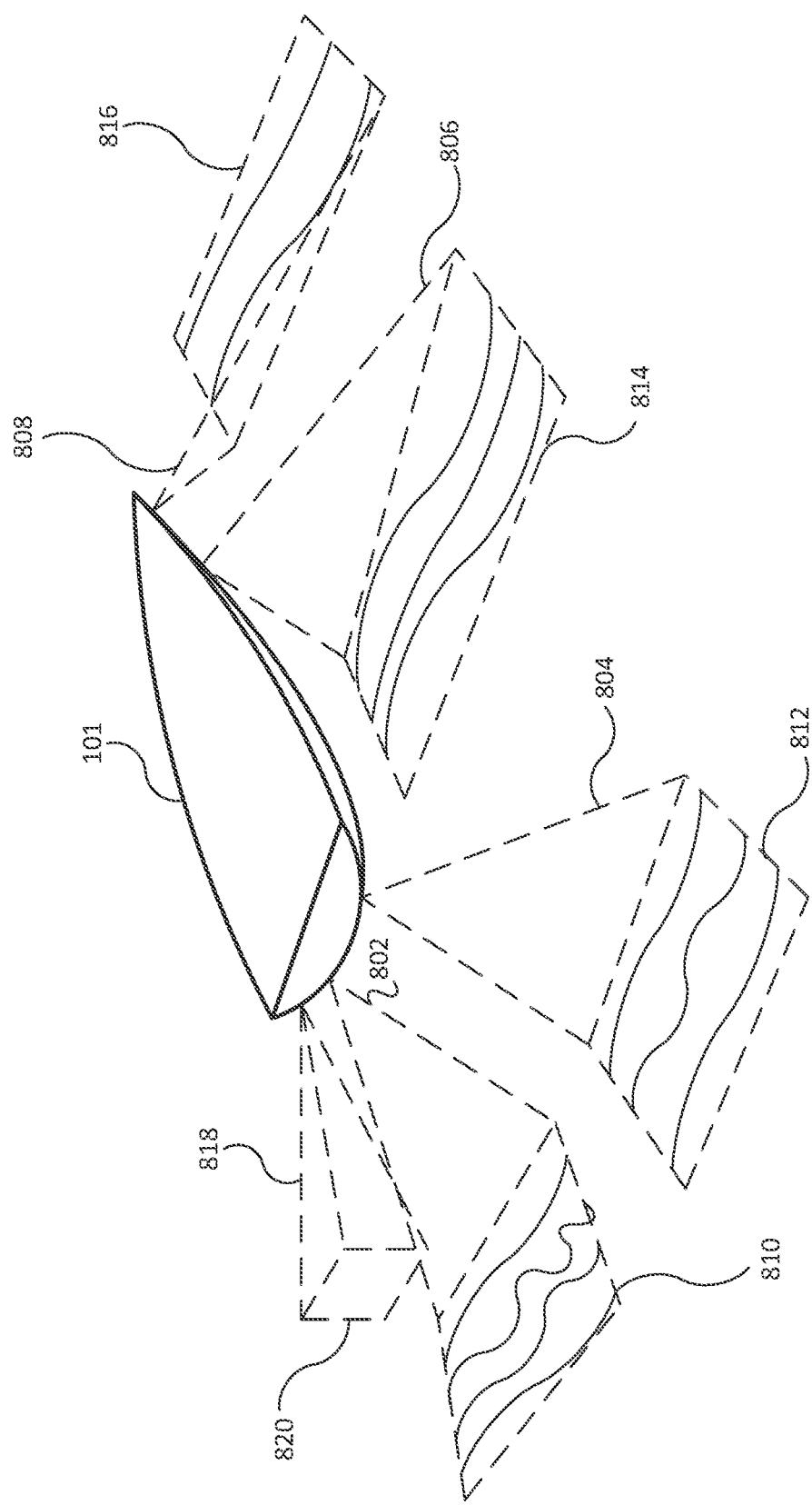
FIG. 8 illustrates a diagram of a sensor fusion navigational system operating in another example environment in accordance with an embodiment of the disclosure.

FIG. 8 illustrates a diagram of a sensor fusion navigational system operating in another example environment in accordance with an embodiment of the disclosure. FIG. 8 includes mobile structure 101 implemented with sonars 802, 804, 806, and 808 as well as a thermal sensor 818. Each of sonars 802, 804, 806, and 808 may determine a portion of the sea and/or sea bed. In FIG. 8, sonars 802, 804, 806, and 808 may determine sea bed portions 810, 812, 814, and 816, respectively. In certain embodiments, each individual sonar may be configured to determine different portions of the sea bed and/or portion of the sea. The sonars of various such embodiments may be, for example, single channel sonars (e.g., sonar systems configured to ensonify portions of a water column using a single transmission and/or reception channel) or multichannel sonars (e.g., sonar systems configured to ensonify portions of a water column using multiple transmission and/or reception channels). The data of the various sonars may be combined by any technique described herein to create an integrated model. In certain embodiments, techniques such as, for example, multilateration may be used to determine a distance and/or direction from mobile structure 101 to any items or terrain detected by the ranging sensor systems (sonar, LIDAR, and/or radar). Multilateration may be performed using a plurality of ranging sensor systems.

In certain embodiments, individual sonar systems and/or assemblies may be configured to operate at different distances (e.g., configured to sense features within a water column within different minimum and/or maximum ranges from the sonar assemblies, using different transmission frequencies and/or powers, different orientations, and/or other sonar system characteristics, for example). Thus, the individual sonars may be configured to determine portions of the sea bed and/or portion of the sea that are at different distances (e.g., sonar 806 may determine the portion of the sea bed at a first distance in front of mobile structure 101 and sonar 808 may determine the portion of the sea bed at a second distance in front of mobile structure 101). Other such embodiments may position the various sonars to cover a maximum area around mobile structure 101 (e.g., to cover a spherical or semi-spherical volume of the sea around mobile structure 101). The sonar of certain such embodiments may be adjustable to cover multiple distances, areas, and/or volumes or to cover any blind spots. The sonars may be manipulated and repositioned automatically (e.g., by the controller) or responsive to include of a user. In certain other embodiments, different sonars may determine different portions of the sea bed or may determine a portion of the sea or items located in the portion of the sea (e.g., a sonar may be pointed in the forward direction of mobile structure 101 to determine whether there are fish or other items in the path of mobile structure 101).

One or more of sonars 802, 804, 806, and/or 808 may include an orientation sensor and/or a separate orientation sensor associated with one or more of sonars 802, 804, 806, and/or 808. The orientation sensors may help position the respective sonars and/or aid in the generation of a navigational database, point cloud database, and/or integrated model. The sonars, thermal sensor(s), as well as other sensors may be networked via wired and/or wireless connections and may output data to a controller or logic device that may combine the various data and generate an integrated model. In certain embodiments, the integrated model may be a three dimensional representation of an environment around mobile structure 101 (e.g., an underwater and/or above water environment around mobile structure 101). Additionally, certain other embodiments may include LIDAR and/or radar in addition to or in lieu of the sonars.

Thermal sensor 818 may determine a temperature or temperature distribution of sea portion 820. Certain embodiments may include a thermal sensor that may be positioned in various positions, allowing for thermal imaging of multiple portions of the sea. Other embodiments may include multiple thermal sensors that may be configured to image different portions of the sea or sea bed.

FIG. 9A illustrates a diagram of a display of a sensor fusion navigational system displaying an integrated model representing the example environment of FIG. 8 in accordance with an embodiment of the disclosure. Integrated model 800A shown in FIG. 9A may render an ocean surface 822, sea bed portions 810, 812, 814, and 816, and a thermal distribution 820A.

Sea bed portions 810, 812, 814, and 816 may be rendered from data generated by sonars 802, 804, 806, and 808 of FIG. 8. The rendering of sea bed portions 810, 812, 814, and 816 may include graphics or depictions showing a terrain of the respective portions. In other embodiments, the rendering of sea bed portions 810, 812, 814, and 816 (as well as any other portions of the sea) may additionally include renderings displaying any flora or fauna (e.g., any animals such as fish swimming in the sea or lobsters crawling on the sea floor). In certain embodiments, the sonars may be configured to, for example, allow full coverage of the sea and/or sea floor or coverage of a portion of an area or volume around the mobile structure 101 (e.g., sonar may cover an entire portion of an area or volume forward of the mobile structure 101).

Additionally, thermal distribution 820A may be determined from thermal data generated by the thermal sensor 818. Thermal distribution 820A may be rendered with graphics that may communicate the temperature of various temperatures of the water within the distribution. In certain embodiments, thermal distribution 820A may communicate the temperature with, for example, color graphics. Each color may correspond to a temperature or temperature distribution. Thermal distribution 820A rendered may be a solid graphic or a transparent or semi-transparent graphic.

Figure 9B:
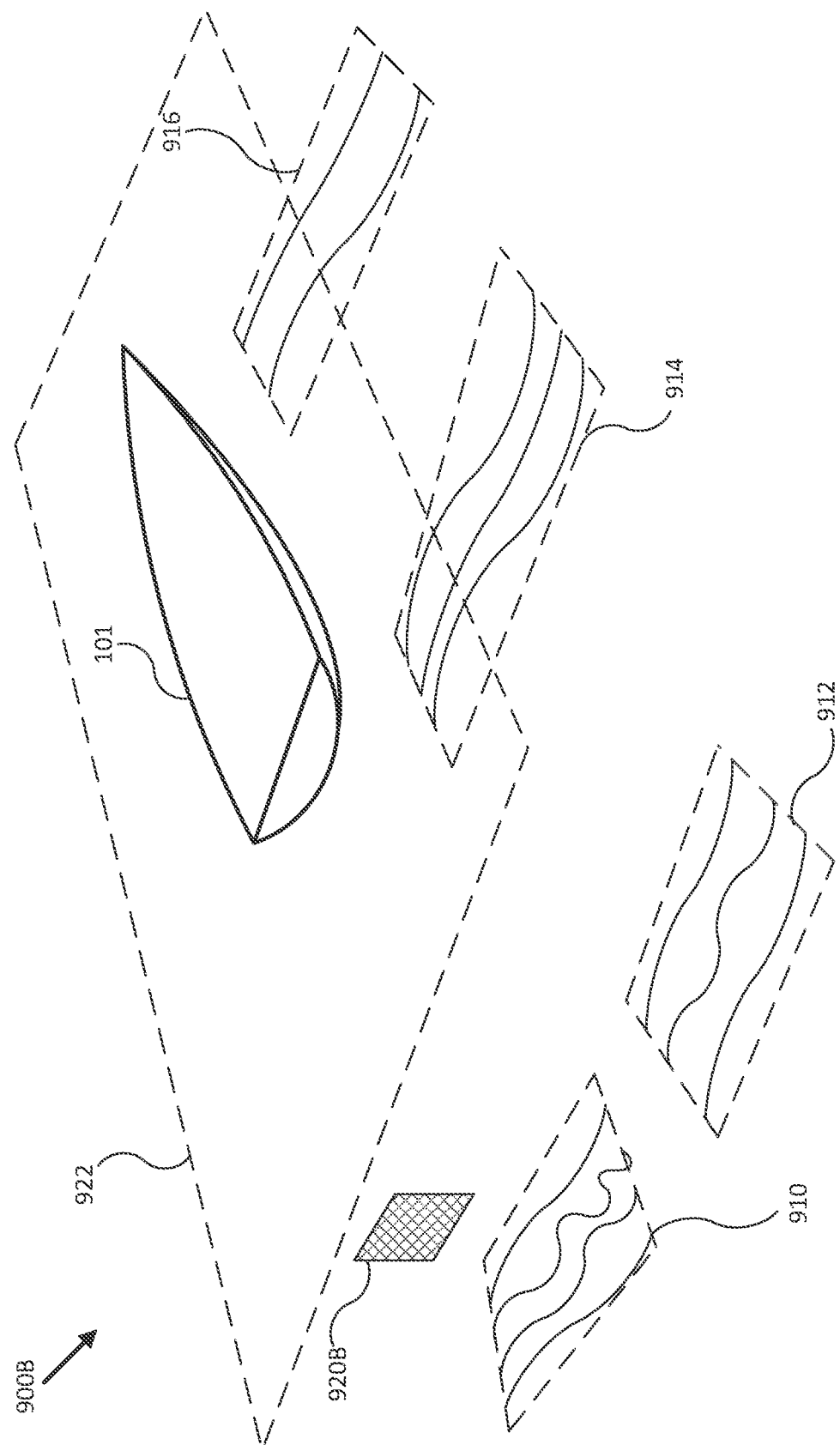
FIG. 9B illustrates another diagram of a display of a sensor fusion navigational system displaying another view of the integrated model representing the example environment of FIG. 8 in accordance with an embodiment of the disclosure.

FIG. 9B illustrates another diagram of a display of a sensor fusion navigational system displaying another view of the integrated model representing the example environment of FIG. 8 in accordance with an embodiment of the disclosure. Integrated model 900B may be a predictive view generated by a controller according to data determined by the various sensors of mobile structure 101. Ranged as well as non-ranging sensor systems of mobile structure 101 may include a time of acquisition of the data along with the data. With the time of acquisition, the controller may be able to generate a database or multiple databases that allows for a historical model to be created. The historical model, along with the current data outputted by the sensors, may then be used by the controller to create a predictive view for the integrated model. The controller and/or mobile structure 101 may include autopilot functions and in certain embodiments, future movements determined by the autopilot may be adjusted according to the predictive view.

Accordingly, in FIG. 9B, the position of mobile structure 101 may have changed from the position of mobile structure 101 in FIG. 9A. Such a change in position may be predicted by, for example, the controller according to a detected speed, acceleration, heading, and/or other dynamic detected by sensors.

In integrated model 900B, thermal distribution 820B may be a predictive distribution (e.g., a prediction of what the temperature of the area highlighted by the thermal distribution 820B may be at a future time). The predictive distribution may be determined by, for example, detected currents, terrain features, current thermal distributions, movement of the mobile structure, forced current movements (e.g., from propellers), movement of flora and/or fauna, as well as other factors detected by the mobile structure 101.

Figure 10:
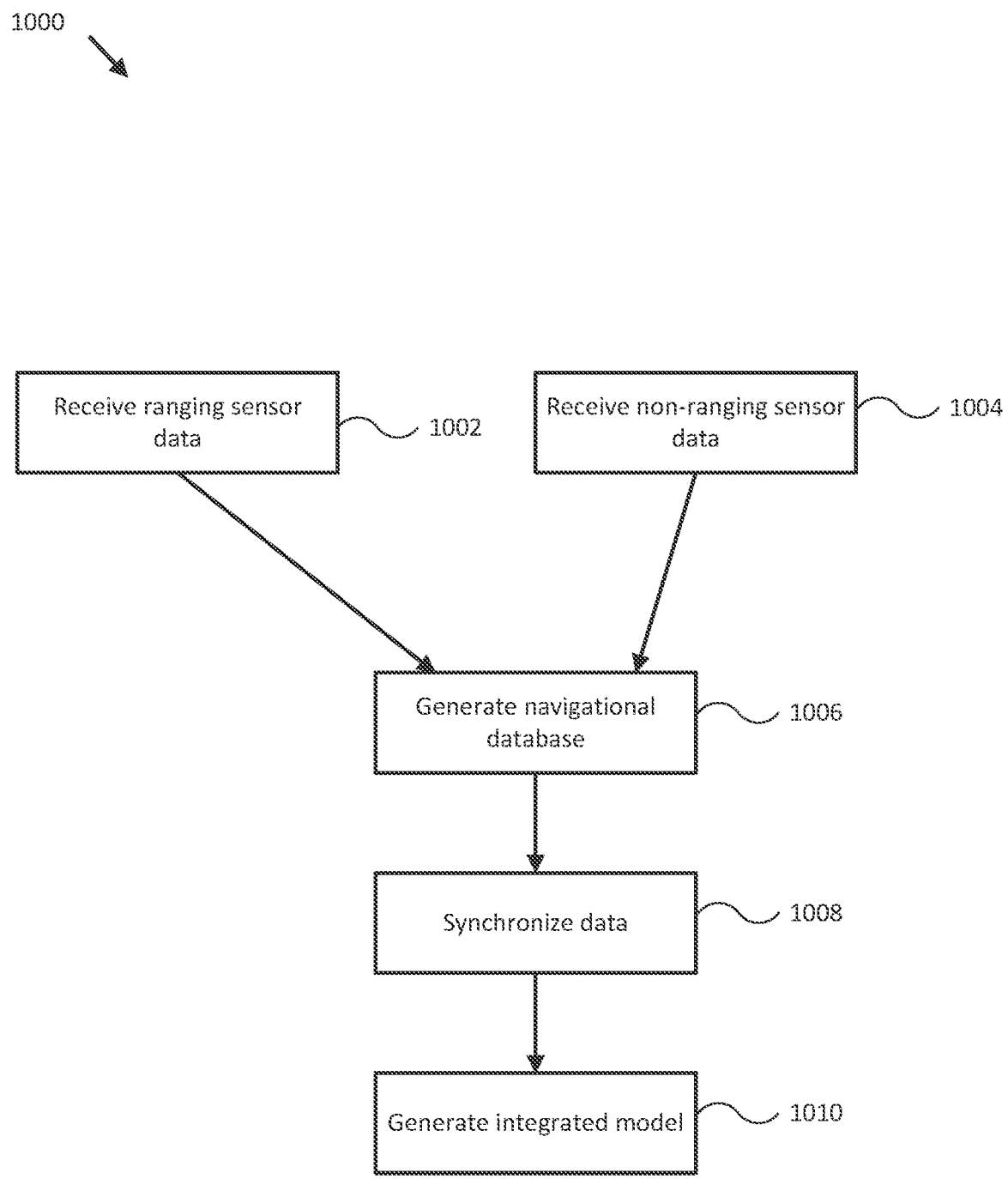
FIG. 10 illustrates a flowchart of a process for combining sensor fusion navigational systems in accordance with an embodiment of the disclosure.

FIG. 10 illustrates a flowchart of a process for combining sensor fusion navigational systems in accordance with an embodiment of the disclosure. It should be appreciated that any step, sub-step, sub-process, or block of process 100 may be performed in an order or arrangement different from the embodiments illustrated by FIG. 10. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although the process 100 may be described with reference to systems described in reference to FIGS. 1-4, the process illustrated in FIG. 10 may be performed by other systems different from those systems and including a different selection of electronic devices, sensors, assemblies, mobile structures, and/or mobile structure attributes.

In block 102, ranging sensor data is received. For example, controller 130 may be configured to receive ranging sensor data from sonar systems, LIDAR systems, radar systems, and/or other ranging sensor systems. Such sensors may generate ranging sensor data and such ranging sensor data may be communicated to controller 130.

In block 104, non-ranging sensor data is received. For example, controller 130 may be configured to receive non-ranging sensor data from thermal sensors, sea state sensors, visual and thermal imaging devices, and/or other non-ranging sensor systems. Such sensors may generate non-ranging sensor data and such non-ranging sensor data may be communicated to controller 130.

In block 106, a navigational database is generated. For example, controller 130 may be configured to generate navigational database 222a with ranging and/or non-ranging sensor data as well as other sensor data. The navigational database may include sensor data, external data, route instruction data, orientation and/or position data, as well as other data. The database may fuse together data from multiple sensors. In certain embodiments, system 100 may be configured to provide autopilot capabilities. Such an autopilot may determine and/or receive an initial route, for example, and determine or suggest an alternative route based on detected debris, hazards, and/or other features from data aggregated within navigational database 222a.

In block 108, the data is synchronized. For example, controller 130 may be configured to synchronize data within navigational database 222a. Such data may be synchronized by, for example, grouping sensor data according to corresponding orientation and/or position data, grouping data obtained at substantially the same time (e.g., obtained within a selected time period of each other, such as within 1 second of each other, for example), grouping data related to a similar aspect (e.g., grouping all data related to underwater features together), grouping data obtained from a particular sensor, multiple similar sensors, or from the same or similar source, grouping data according to user selection, and/or grouping data according to another methodology, for example, and/or otherwise synchronizing, partitioning, and/or grouping the data within navigational database 222a. Certain embodiments may additionally include multiple such groupings.

In block 1010, an integrated model is generated. For example, controller 130 may be configured to generate integrated model 222b from navigational database 222a (generated in block 610). For example, some or all of data within navigational database 222a may be used to generate integrated model 222b. In some embodiments, integrated model 222b may be a 2D or 3D representation of the environment near and/or proximate the mobile structure. As a non-limiting example, image data, sonar data, radar data, and/or other data within navigational database 222a may be used to generate integrated model 222b. In various embodiments, integrated model 22b may facilitate and/or include forecasting, compensating, and/or autopilot capabilities.

It is contemplated that any one or combination of methods to provide augmented reality sonar imagery may be performed according to one or more operating contexts of a control loop, for example, such as a startup, learning, running, and/or other type operating context. For example, process 100 may proceed back to block 102 and proceed through process 100 again to produce and updated navigational database and/or integrated model, as in a control loop.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
    a plurality of ranging sensor systems associated with a mobile structure, wherein three or more of the ranging sensor systems are configured to sense at least a portion of an underwater environment and provide corresponding ranging sensor data associated with the portion of the underwater environment; and
    a logic device, wherein the logic device is configured to:
        receive the ranging sensor data from the plurality of ranging sensor systems,
        generate a point cloud database based, at least in part, on the ranging sensor data from the three or more ranging sensor systems, and
        generate an integrated model of at least the portion of the underwater environment by combining the ranging sensor data from the three or more ranging sensor systems based, at least in part, on the point cloud database;
    wherein the three or more ranging sensor systems comprise at least a first sonar system and a second sonar system, and at least one non-sonar-based ranging sensor system; and
    the first sonar system is configured to operate across a first range of distances from the mobile structure, and a second sonar system is configured to operate across a second range of distances from the mobile structure, the second range of distances being different from the first range of distances.

2. The apparatus of claim 1, wherein:
    the integrated model comprises a three dimensional representation of the underwater environment.

3. The apparatus of claim 1, wherein the three or more ranging sensor systems comprises at least one LIDAR and/or radar system, and wherein the combining the ranging sensor data comprises combining the ranging sensor data using a multilateration technique.

4. The apparatus of claim 1, wherein:
    the plurality of ranging sensor systems comprises a plurality of single channel ranging sensor systems or at least one single channel ranging sensor system and/or at least one multichannel ranging sensor system.

5. The apparatus of claim 1, further comprising at least one non-ranging sensor configured to provide non-ranging sensor data to the logic device, wherein the logic device is configured to generate the integrated model of the underwater environment by combining the non-ranging sensor data and the ranging sensor data from the three or more ranging sensor systems.

6. The apparatus of claim 5, wherein:
    the at least one non-ranging sensor comprises a thermal sensor configured to provide thermal data indicating a temperature of at least a portion of the underwater environment, the non-ranging sensor data comprises the thermal data, and the integrated model comprises an indicator representing the temperature by a colored surface rendered within a three dimensional representation of the underwater environment; and/or the at least one non-ranging sensor comprises an attitude sensor configured to provide attitude data indicating an attitude of the mobile structure and the non-ranging sensor data comprises the attitude data.

7. The apparatus of claim 1, wherein at least one of the ranging sensor systems is not coupled to the mobile structure, the mobile structure comprises a first mobile structure, and the ranging sensor data comprises first ranging sensor data, and wherein the logic device is configured to:
receive data describing a first route for the first mobile structure and a second route for a second mobile structure, wherein the first route comprises a first predictive route for the first mobile structure and the second route comprises a second predictive route for the second mobile structure;
receive second ranging sensor data from at least one additional ranging sensor system associated with the second mobile structure;
generate the integrated model of the at least portion of the underwater environment by combining the first and second ranging sensor data, wherein the integrated model comprises an historical view, a current view, and/or a predictive view of the environment of the mobile structure.

8. The apparatus of claim 1, further comprising a user interface coupled to or separate from the mobile structure, wherein the logic device is configured to:
receive a time of acquisition of the ranging sensor data from at least one ranging sensor system;
generate the integrated model by combining the ranging sensor data according to the time of acquisition of the ranging sensor data, wherein the integrated model comprises a predictive view of the environment of the mobile structure, the predictive view representing a view of the environment of the mobile structure at a future time; and
display the predictive view using a display of the user interface.

9. The apparatus of claim 1, wherein the logic device is configured to:
receive global navigation satellite system (GNSS) data associated with the mobile structure;
determine a global position of the mobile structure based, at least in part, on the GNSS data and the ranging sensor data; and
generate the integrated model by combining the GNSS data with the ranging sensor data.

10. The mobile structure including the apparatus of claim 1, wherein the mobile structure comprises a watercraft, and wherein the logic device is configured to:
autopilot the mobile structure according to a first route; and
adjust the first route to a second route responsive to a predictive view of the integrated model.

11. A method comprising:
receiving ranging sensor data from a plurality of ranging sensor systems associated with a mobile structure, wherein three or more of the ranging sensor systems are configured to sense at least a portion of an underwater environment and provide corresponding ranging sensor data associated with the portion of the underwater environment;

generating a point cloud database based, at least in part, on the ranging sensor data from the three or more ranging sensor systems; and
generating an integrated model of the underwater environment by combining the ranging sensor data from the three or more ranging sensor systems based, at least in part, on the point cloud database;
wherein the three or more ranging sensor systems comprise at least a first sonar system and a second sonar system, and at least one non-sonar-based ranging sensor system; and
the first sonar system is configured to operate across a first range of distances from the mobile structure, and a second sonar system is configured to operate across a second range of distances from the mobile structure, the second range of distances being different from the first range of distances.

12. The method of claim 11, wherein the integrated model comprises a three dimensional representation of the underwater environment.

13. The method of claim 11, wherein the three or more ranging sensor systems comprises at least one LIDAR and/or radar system, and wherein the combining the ranging sensor data comprises combining the ranging sensor data using a multilateration technique.

14. The method of claim 11, wherein:
the plurality of ranging sensor systems comprises a plurality of single channel ranging sensor systems or at least one single channel ranging sensor system and/or at least one multichannel ranging sensor system.

15. The method of claim 11, further comprising generating the integrated model of the underwater environment by combining non-ranging sensor data from at least one non-ranging sensor and the ranging sensor data from the three or more ranging sensor systems.

16. The method of claim 15, wherein:
the at least one non-ranging sensor comprises a thermal sensor configured to provide thermal data indicating a temperature of at least a portion of the underwater environment, the non-ranging sensor data comprises the thermal data, and the integrated model comprises an indicator representing the temperature by a colored surface rendered within a three dimensional representation of the underwater environment; and/or
the at least one non-ranging sensor comprises an attitude sensor configured to provide attitude data indicating an attitude of the mobile structure and the non-ranging sensor data comprises the attitude data.

17. The method of claim 11, wherein at least one of the ranging sensor systems is not coupled to the mobile structure, the mobile structure comprises a first mobile structure, and the ranging sensor data comprises first ranging sensor data, and wherein the method further comprises:
receiving data describing a first route for the first mobile structure and a second route for a second mobile structure, wherein the first route comprises a first predictive route for the first mobile structure and the second route comprises a second predictive route for the second mobile structure;
receiving second ranging sensor data from at least one additional ranging sensor system associated with the second mobile structure;
generating the integrated model of the at least portion of the underwater environment by combining the first and second ranging sensor data, wherein the integrated model comprises an historical view, a current view, and/or a predictive view of the environment of the mobile structure.

18. The method of claim 11, further comprising:
receiving a time of acquisition of the ranging sensor data from at least one ranging sensor system;
generating the integrated model by combining the ranging sensor data according to the time of acquisition of the ranging sensor data, wherein the integrated model comprises a predictive view of the environment of the mobile structure, the predictive view representing a view of the environment of the mobile structure at a future time; and
displaying the predictive view using a display of a user interface.

19. The method of claim 11, further comprising:
receiving global navigation satellite system (GNSS) data associated with the mobile structure;
determining a global position of the mobile structure based, at least in part, on the GNSS data and the ranging sensor data; and
generating the integrated model by combining the GNSS data with the ranging sensor data.

20. The method of claim 11, further comprising:
autopiloting the mobile structure according to a first route, wherein the mobile structure comprises a watercraft; and
adjusting the first route to a second route responsive to a predictive view of the integrated model.

* * * * *

UNITED STATES PATENT AND TRADEMARK OFFICE
CERTIFICATE OF CORRECTION

PATENT NO. : 10,989,537 B2  
APPLICATION NO. : 15/977035  
DATED : April 27, 2021  
INVENTOR(S) : Paul Stokes et al.

Page 1 of 1

It is certified that error appears in the above-identified patent and that said Letters Patent is hereby corrected as shown below:

In the Specification

In the Detailed Description:
In Column 24, Line 16, change "U.S. patent application Ser. No." to --U.S. Patent Application No. --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*